(12) United States Patent
Parekh et al.

(10) Patent No.: US 7,203,744 B1
(45) Date of Patent: Apr. 10, 2007

(54) RULE COMPILER FOR COMPUTER NETWORK POLICY ENFORCEMENT SYSTEMS

(75) Inventors: Pankaj Parekh, Fremont, CA (US); Sandeep Gupta, Delhi (IN); Vijay Mamtani, New Delhi (IN); Puneet Tutliani, New Delhi (IN); Proneet Biswas, Milpitas, CA (US)

(73) Assignee: iPolicy Networks, Inc., Fremont, CA (US)

( * ) Notice: Subject to any disclaimer, the term of this patent is extended or adjusted under 35 U.S.C. 154(b) by 743 days.

(21) Appl. No.: 10/264,889

(22) Filed: Oct. 7, 2002

(51) Int. Cl.
*G06F 15/173* (2006.01)

(52) U.S. Cl. .................. 709/223; 709/224; 709/229; 709/232

(58) Field of Classification Search ........ 709/223–224, 709/229, 232
See application file for complete search history.

(56) References Cited

U.S. PATENT DOCUMENTS

| | | | |
|---|---|---|---|
| 5,889,953 A * | 3/1999 | Thebaut et al. | 709/221 |
| 6,148,303 A * | 11/2000 | Morimoto et al. | 707/102 |
| 6,381,639 B1 * | 4/2002 | Thebaut et al. | 709/222 |
| 6,578,076 B1 * | 6/2003 | Putzolu | 709/223 |
| 6,601,034 B1 * | 7/2003 | Honarvar et al. | 705/7 |
| 6,880,005 B1 * | 4/2005 | Bell et al. | 709/225 |

* cited by examiner

*Primary Examiner*—Ario Etienne
*Assistant Examiner*—LaShonda Jacobs
(74) *Attorney, Agent, or Firm*—William L. Botjer

(57) ABSTRACT

An integrated policy enforcement system for a computer network implements several policies on the network traffic. A rule compiler compiles these policies and converts them into a rule tree-graph, which is then used to provide desired behavior to the network traffic comprising data packets. The rule compiler comprises three sub-modules namely—a rule input module, a rule tree generator module and a rule output module. The rule input module receives the input for the rule compiler and prepares the input for the rule tree generator module. The rule tree generator module generates the rule tree-graph. The rule tree-graph is a data structure comprising tree data structure and graph data structure. Such a data structure combines the properties of tree data structure and graph data structure, and enhances the performance of the policy enforcement systems by striking a balance between the memory requirement for storing the data structure and the processing capabilities of the system required to process the network traffic. The Output module converts the rule tree-graph to policy files, which can be downloaded to various modules of the policy enforcement systems.

11 Claims, 17 Drawing Sheets

| IP-1 | 10.1.1.1 |
| IP-2 | 10.1.1.1-10.1.1.100 |
| IP-3 | 10.1.1.20-10.1.1.30 |
| IP-4 | 10.1.1.50 |
| IP-5 | 252.23.45.99 |

FIG. 5

| Bucket No. | Represents IP Range | Satisfies Rules Containing IP Addresses |
| --- | --- | --- |
| Bucket 1 | 10.1.1.1 | IP-1, IP-2 |
| Bucket 2 | 10.1.1.2-10.1.1.19 | IP-2 |
| Bucket 3 | 10.1.1.20-10.1.1.30 | IP-2, IP-3 |
| Bucket 4 | 10.1.1.31-10.1.1.49 | IP-2 |
| Bucket 5 | 10.1.1.50 | IP-2, IP-4 |
| Bucket 6 | 10.1.1.51-10.1.1.100 | IP-2 |
| Bucket 7 | 252.23.45.99 | IP-5 |

FIG. 6

| S. No. | Rule No. | Condition expressions | Action |
|---|---|---|---|
| 1 | R1 | L3 = ARP | FW1 |
| 2 | R2 | (L3 = IP AND L4 = ICMP) | FW2 |
| 3 | R3 | (L3 = IP AND L4 = UDP) | FW3 |
| 4 | R4 | (L3 = IP AND SRCIP = IP1 AND DESTIP = IP2) | FW4 |
| 5 | R5 | (L3 = IP AND SRCIP = IP1) | FW5 |
| 6 | R6 | (L3 = IP AND DESTIP=IP2 AND L4 = TCP AND APP = HTTP) | FW6 |
| 7 | R7 | (L3 = IP AND DESTIP=IP2 AND L4 = TCP AND APP = FTP) | IDS1 |
| 8 | R8 | (L3 = IP AND DESTIP=IP2 AND L4 = TCP AND APP = FTP AND FTP_TX = GET) | IDS2 |
| 9 | R9 | (L3 = IP AND DESTIP=IP2 AND L4 = TCP AND APP = FTP AND FTP_TX = PUT) | FW7 |
| 10 | R10 | (L3 = IP AND DESTIP=IP2 AND L4 = TCP AND APP = HTTP AND HTTP_TX = GET) | IDS3 |
| 11 | R11 | (L3 = IP AND DESTIP=IP2 AND L4 = TCP AND APP = HTTP AND HTTP_TX = POST) | FW8 |

FIG. 8

| S. No. | Expression | No. of Rules | Expression Category | Search Type | Expr Type Weight | Search Type Weight | Occurrence Weight | Expression Weight |
|---|---|---|---|---|---|---|---|---|
| 1 | SrcIP | 2 | Session | IntMatch | 2000 | 10 | 2 | 2012 |
| 2 | DestIP | 7 | Session | IntMatch | 2000 | 10 | 7 | 2017 |
| 3 | L4 | 10 | Session | IntMatch | 2000 | 10 | 10 | 2020 |
| 4 | L3 | 11 | Session | IntMatch | 2000 | 10 | 11 | 2021 |
| 5 | App | 6 | Session | IntMatch | 2000 | 10 | 6 | 2016 |
| 6 | FTP_Tx | 2 | Data | IntMatch | 0 | 10 | 2 | 12 |
| 7 | HTTP_Tx | 2 | Data | IntMatch | 0 | 10 | 2 | 12 |

FIG. 11

|    | L3  | L4   | DIP | APP  | SIP | FTP_TX | HTTP_TX |
|----|-----|------|-----|------|-----|--------|---------|
| R1 | ARP | NA   | NA  | NA   | NA  | NA     | NA      |
| R2 | IP  | ICMP | *   | NA   | *   | NA     | NA      |
| R3 | IP  | UDP  | *   | NA   | *   | NA     | NA      |
| R4 | IP  | *    | IP2 | *    | IP1 | *      | *       |
| R5 | IP  | *    | *   | *    | IP1 | *      | *       |
| R6 | IP  | TCP  | IP2 | HTTP | *   | NA     | *       |
| R7 | IP  | TCP  | IP2 | FTP  | *   | *      | NA      |
| R8 | IP  | TCP  | IP2 | FTP  | *   | GET    | NA      |
| R9 | IP  | TCP  | IP2 | FTP  | *   | PUT    | NA      |
| R10| IP  | TCP  | IP2 | HTTP | *   | NA     | GET     |
| R11| IP  | TCP  | IP2 | HTTP | *   | NA     | POST    |

FIG. 12

RULE COMPILER FOR COMPUTER NETWORK POLICY ENFORCEMENT SYSTEMS

BACKGROUND

The invention relates to integrated policy enforcement systems for computer networks. In particular the invention provides a method and system for compiling policies for integrated policy enforcement systems.

The emergence and advancement of networks and networking technologies has revolutionized information exchange between organizations. A network may be defined as a group of computers and associated devices that are connected via communication links. These communication links can be wireless communication links. All the devices connected over a network are capable of communicating (i.e. sending and receiving information) with other devices connected to the network.

A network can range from one that connects a few devices in a single office to one that spans continents and connects several thousand computers and associated devices. Networks are generally classified as Local Area Networks (LANs) and Wide Area Networks (WANs) based on the geographic area they cover. A LAN is a network connecting servers, computers and associated devices within a small geographic area. LANs are widely used to connect servers, computers and devices in organizations to exchange information. A WAN is a network that links at least two LANs, which are spread over a wide geographic area. A network of an organization connecting devices and resources of the organization is called an intranet. The devices and resources in an intranet may be connected over a LAN or WAN. The globally interlinked collection of LANs, WANs and intranets is called the Internet. The Internet can thus be called a network of networks. The Internet allows exchange of information between LANs, WANs and intranets that are connected to it.

Most organizations link their intranets with the Internet to allow information exchange with different organizations. Information exchange involves transfer of data packets. Organizations allow legitimate users on the Internet to access their intranets for information exchange. Legitimate users are people outside the organization who have authorization from the organization to access its intranet. Such information exchange poses a security risk as the organization's intranet becomes accessible to outsiders. Illegitimate users can change data, gain unauthorized access to data, destroy data, or make unauthorized use of computer resources. These security issues require organizations to implement safeguards that ensure security of their networks.

Various solutions are available to deal with such security issues. Most of these solutions implement a security policy on network traffic to address security concerns and are known as 'policy enforcement systems'. Network traffic comprises data packets flowing through the network. The policy comprises a set of rules that checks data packets flowing though the network for irregularities. The rules comprise conditions that are checked based on properties of data packets. Based on this check, the security solution regulates network traffic.

One of the commonly used security solution that implements a policy is a firewall. Firewalls are installed between an organization's intranet and the Internet. Firewalls, being policy-based security devices, selectively allow or disallow data packets from entering or leaving the organization's intranet.

Firewalls inspect each data packet entering or leaving the intranet against a set of rules. Hence, the performance of a firewall suffers with an increase in the number of rules, because each data packet has to be checked against an increased number of rules. This decreases the number of packets that the firewall can process per unit time. Moreover, an increase in the volume of network traffic increases the number of packets that have to be checked against the rules per unit time. Due to these limitations, conventional firewalls systems are capable of implementing only a limited number of rules and can handle only a limited volume of network traffic.

An effort to overcome these problems has been made by U.S. Patent Application No. U.S. 2002/0032773 assigned to SERVGATE Technology, Inc. and titled "System, Method And Computer Software Product For Network Firewall Fast Policy Lookup". The patent describes a system and method for faster rule lookup. The method described in the patent application improves the speed of rule lookup in firewalls. Firewalls store all the rules against which the data packets passing though the firewall have to be checked. For implementing security, firewalls perform a table lookup, which involves validating a data packet against rules defined in the policy table. The patent describes a method that allows for faster rule lookup than conventional firewall systems. This is achieved by simplifying the table lookup process.

Though, most networks are protected by firewalls but firewalls do not provide a complete security solution. This is because firewalls can be circumvented through various techniques such as "tunneling" and "back doors". Moreover, a firewall alone cannot provide information regarding any attack that is successfully repelled. Such information can be used to block future such attacks. Intrusion Detection Systems (IDS) are thus used as a protection against such attempts to exploit the devices connected over the network.

Intrusion Detection Systems adopt either a network or a host based approach to recognize and stop attacks. In both cases, the IDS looks for attack signatures. Attack signatures are patterns that indicate any harmful intent. If an IDS checks for such patterns in network traffic, then it is said to be following a network-based approach. Whereas, if an IDS searches for attack signatures in log files then it is said to be following a host based approach. Log files contain records of events and activities taking place at individual computers and associated devices. If an attack is detected, the IDS may take corrective measures like administrator notification and connection termination.

Network-based IDS is essentially used for detecting attacks that emanate from outside the organization's intranet. Typically, network-based IDSs use two approaches to analyze the network traffic, viz. pattern matching and anomaly detection. Pattern matching involves comparison of network traffic with signatures of known attacks. These signatures are generally stored in a database and serve as a basis of comparison with the network traffic. In anomaly detection, the IDS checks for any unusual activity in the network traffic. An unusual activity is defined as one that deviates to a large extent from the normal state of the network traffic. In case IDS finds any such activity, it generates an alert such as administrator notification.

The above-mentioned security systems may be deployed by Internet Service Providers (ISPs) to ensure safety of their customer's intranets. ISPs provide these security services to their customers in addition to various other services like 'Quality of Service'. 'Quality of Service' refers to the ability of an ISP to provide a customer with the best available services based on the terms and conditions of their agreement. The ISPs need to implement policies in order to take a decision for the same.

The above-mentioned policy enforcement systems have some inherent disadvantages. For ISPs and big organizations it becomes necessary to integrate two or more of the above systems to provide enhanced security and services. For example, an organization may like to have a network-based IDS behind a firewall. This configuration will provide enhanced security as it would raise an alert in case of incoming network packets that may have circumvented the firewall. Thus, integrated systems have the potential of offering enhanced security.

An effort in this direction has been made by U.S. Pat. No. 5,996,077 assigned to Cylink Corporation, of Sunnyvale, Calif., USA, and titled "Access Control System And Method Using Hierarchical Arrangement Of Security Devices". The patent describes a system and method for coupling two or more security devices to create an integrated security system that offers enhanced security. The integrated security system is installed between the intranet of an organization and the Internet and receives network traffic consisting of data packets. These data packets are passed through a plurality of security devices that have rules of descending strictness. The first security device receives the data packet and tries to process it by using security rules defined for the first device. If the first security device is not able to process the packet then the packet is passed to the second security device for possible processing using security rules defined for the second device. The process of passing the data packet to the next security device is repeated until the data packet is processed or until the last security device passes the data packet as unprocessed. This system requires a plurality of security devices to have rules of descending strictness. Moreover, processing of data packets by every security device involves rechecking of some conditions defined in the rules. This is because some conditions that were already checked may be rechecked again when the data packet passes through subsequent security devices. This reprocessing will make the above system inefficient if there are a large number of policies to be implemented or if the volume of network traffic increases.

SUMMARY

In light of the foregoing, what is required is a network security system that offers the capability of integrating two or more security devices to offer enhanced security. The system should also be capable of implementing a large number of rules over a large volume of network traffic without adversely affecting its performance.

Accordingly, it is an object of the present invention is to provide a rule compiler for compiling the policies for implementation by an integrated policy enforcement system.

Another object of the present invention is to provide a rule compiler, which generates a rule tree-graph, which is used by the policy enforcement systems to provide desired behavior to the network traffic.

Another object of the present invention is to provide a rule compiler, which extracts the commonalities of the various policies to generate a rule tree-graph.

Yet another object of the present invention is to generate a rule tree-graph, which is a data structure combining the properties of tree data structure and graph data structure; such a data structure makes optimum use of system resources including memory and processing capabilities, thereby efficiently implementing the policies.

An integrated policy enforcement system implements several policies on the network traffic. The rule compiler compiles these policies and converts them into a rule tree-graph, which is then used by a policy enforcement system to provide desired behavior to the network traffic comprising data packets. The rule compiler comprises three sub-modules namely—rule input module, rule tree generator module and rule output module. The rule input module receives the input for the rule compiler and prepares the input for the rule tree generator module. The rule tree generator module generates the rule tree-graph. The rule tree-graph is a data structure comprising tree data structure and graph data structure. Such a data structure combines the properties of tree data structure and graph data structure, and enhances the performance of the policy enforcement systems by striking a balance between the memory requirement for storing the data structure and the processing capabilities of the system required to process the network traffic. The output module converts the rule tree-graph to policy files, which can be downloaded to various modules of the policy enforcement systems.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which:

FIG. 5 illustrates an exemplary IP bucket in accordance with an embodiment of the present invention;

FIG. 6 illustrates a modified IP bucket in accordance with an embodiment of the present invention;

FIG. 8 is a table that illustrates the sample rule set in accordance with an embodiment of the present invention;

FIG. 11 is a table that illustrates the weights assigned to various expressions in accordance with an embodiment of the present invention;

FIG. 12 represents an Expression Value matrix in accordance with an embodiment of the present invention;

DETAILED DESCRIPTION

Definitions

Figure 1:
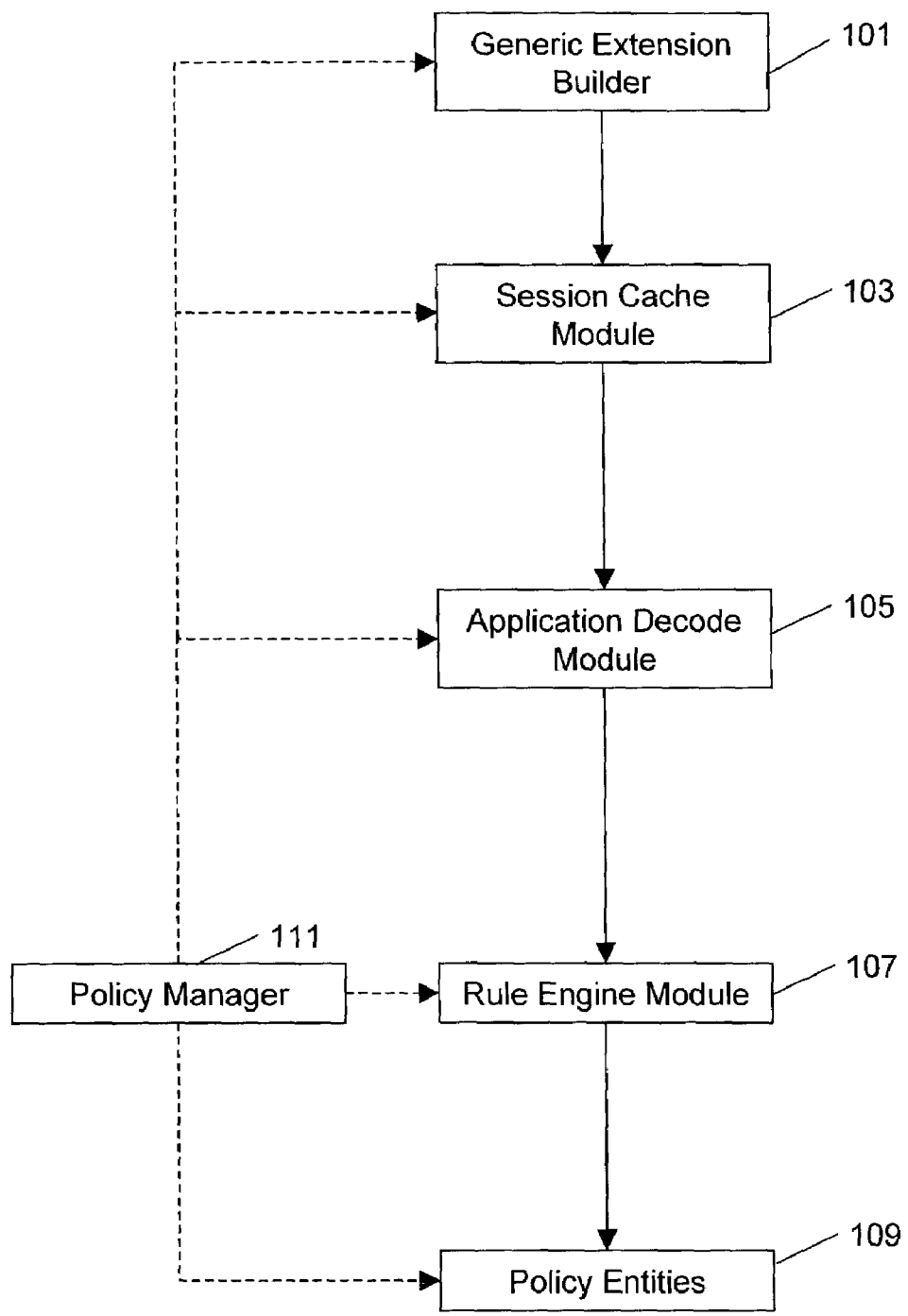
FIG. 1 is a schematic diagram that illustrates the functional modules of an exemplary policy agent.

Data packets: This refers to units of data that are sent on any packet-switched network or the like, and encompasses Transmission Control Protocol/Internet Protocol (TCP/IP) packets, User Datagram Protocol (UDP) packets, which may also be referred as datagrams, or any other such units of data.

Expression: An expression denotes a property of network traffic or other parts of the system, whose value determines the outcome of a condition. Examples of expressions include source IP address, destination IP address, and layer 3 protocol.

Condition: A condition is a set of expressions and their values.

Expression Value Tree: This refers to a tree depicting the relationship between various expressions and their values. The expressions and values form nodes of the tree. All expressions have values as their child nodes and all values may have other expressions as their child nodes.

Adjacency: Adjacency is defined between an expression and a value of another expression. An expression and a value are said to be adjacent when the expression and the value meet at a value node of expression value tree.

Rule: A rule is defined as an action associated with a set of conditions.

Policies: A set of rules is called a policy.

Tree data structure: A tree data structure is a data structure comprising nodes and edges. A node can be root node, leaf node or an internal node. Root node is the starting node of a tree. There is only one root node in a tree. On traversing tree from top to bottom, root node is the first node encountered. The tree starts from a root node and ends at leaf nodes. Nodes other than root node and leaf nodes are termed internal nodes. An Internal node has one or more child nodes and is called the parent of its child nodes. All children of the same node are siblings. In a tree only one path exists between two nodes.

Graph data structure: A graph data structure is a data structure comprising vertices and edges. The vertices of the graph are equivalent to nodes of a tree and are connected via edges. In a graph, there can be multiple paths between two vertices. Tree-graph: This refers to a data structure, which is a combination of two types of data structures namely, tree and graph. The tree-graph data structure starts as a tree. The tree ends at tree leafs, from where the graphs start.

Rule tree-graph: This refers to a data structure where the rules are represented in form of tree-graph data structure.

Path node: This refers to a node in rule tree-graph.

Path edge: This refers to an edge in rule tree-graph that starts from a path node and leads to the next path node. A path edge may lead to a tree node or to a graph node.

Tree node: This refers to a node in rule tree-graph that is a part of the tree portion of rule tree-graph.

Tree edge: This refers to an edge in rule tree-graph that leads out of a tree node. A tree edge is the leaf edge of the tree part of the rule tree-graph, if it goes into a 'start of graph' node. The leaf edge of the tree always contains a distinct tree-id.

Tree ID: Each leaf edge of the tree has a unique identity associated with it. The tree ID refers to this unique identity of the tree edge.

Matched rules in a tree: A rule may get matched in the tree part of the rule tree-graph. An edge of a tree gives rules that have matched as a result of reaching that part of the tree. The leaf of the tree, which is also the start of graph, gives all the rules that have matched in the tree.

Pending rules in a graph: On reaching a particular edge of rule tree-graph, few rules get matched within the tree portion, while few others get matched in the graph portion. The rules that get matched or decided in the graph are grouped in a set of pending rules in a graph. In the graph, few rules out of the pending list of rules may match and few others may get eliminated.

Cutoff value: This parameter governs the point at which the rule compiler terminates a tree and starts a graph. The edge of a tree or a start of graph has 'pending rules in a graph', which is the set of rules that would be matched or decided in the graph. The rule compiler shifts from tree to graph, when the undecided rules are left to equal or below the cutoff value.

Start of graph node: This refers to a node in the rule tree-graph that represents the start of the graph portion of the rule tree-graph. The start of graph is the first node of the graph. The leaf tree edge always leads to the start of graph. The start of graph gives the 'pending rules in a graph'.

Edge Confirmation Bitmap (CB): Confirmation bitmap is a bitmap maintained within a graph-edge. Each bit in this bitmap represents a rule from the set of 'pending rules in a graph'. A bit in this bitmap is set '1' for a graph edge, if taking that edge confirms a rule from the pending set. A rule is confirmed when the value of an expression for that rule is same as the value represented by the edge taken, and that is the last expression value that was to be verified for that rule.

Edge Elimination Bitmap (EB): Elimination bitmap is a bitmap that is maintained within a graph-edge. Each bit in this bitmap represents a rule from the set of 'pending rules in a graph'. A bit in this bitmap is set '0' for a graph edge, if taking that edge eliminates a rule from the pending set.

The present invention is a system and method for compiling rules for implementation on network traffic to provide desired behavior to network traffic.

The present invention is envisaged to be operating in conjunction with an integrated policy enforcement system, hereinafter referred to as policy agent. Policy agent is a system capable of implementing policies related to various functionalities like Firewall, Intrusion Detection (IDS), URL Filtering and Quality of Service (QoS) on the network traffic. The policy agent scans packets as they pass through it, and enforces network policies on these packets. Although the policy agent may be variously provided, a description of one such policy agent can be found in application Ser. No. 10/052,745 filed on Jan. 17, 2002, and entitled "Architecture for an Integrated Policy Enforcement System", the entire contents of which are hereby incorporated by reference. However, it may be noted that the present invention may be adapted to operate in conjunction with other policy agents by one skilled in the art.

It may also be noted that although the present invention is envisaged to be operating in conjunction with a policy agent, this does not limit the scope of the present invention in any manner. The present invention may be adapted to operate independent of a policy agent by one skilled in the art.

FIG. 1 is a schematic diagram that illustrates the functional modules of an exemplary policy agent. Referring to FIG. 1, the various functional modules of the policy agent are generic extension builder 101, session cache module 103, application decode module 105, rule engine module 107 and policy entities 109. The policy agent is also supported by a policy manager 111. A packet entering the policy agent travels through these functional modules. Each functional module appends its output to extensions in the packet, which are then used by subsequent modules of the policy agent.

Generic extension builder 101 processes the packet headers for information related to Open Systems Interconnection (OSI) Layer 2 and Layer 3.

Session cache module 103 processes the packet headers for information related to OSI Layer 4 and above.

Application decode module 105 identifies the application generating the packet and tracks the packet as it transitions from one application state to another.

Rule engine module 107 makes policy decisions based on the information gathered from the previous modules. It identifies partial or complete rules matching and passes this information to policy entities 109.

Policy entities 109 comprise a plurality of policy processing modules that are specific to individual policy type to be enforced. By way of an example, there may be a separate module dealing with policy related to QoS, a separate module dealing with policy related to IDS and so on. These modules further analyze the packet according to the requirements, and subsequently enforce policy. Policy processing modules include, but are not limited to, Firewall modules, Intrusion Detection System (IDS) modules and Virtual Private Network (VPN) modules.

A rule compiler processes rules to generate data structures for efficient implementation of policy on network traffic by the policy agent. These data structures allow the policy enforcement systems to handle large volume of network traffic and efficiently implement various rules on the network traffic. The policies that are implemented can be related to various aspects of network like load balancing, Quality of Service (QoS), and Intrusion Detection System (IDS). These data structures may then be converted to policy files for various modules of the policy agent. Policy Manager 111 retrieves these policy files to the policy agent for enforcement purposes.

Figure 2:
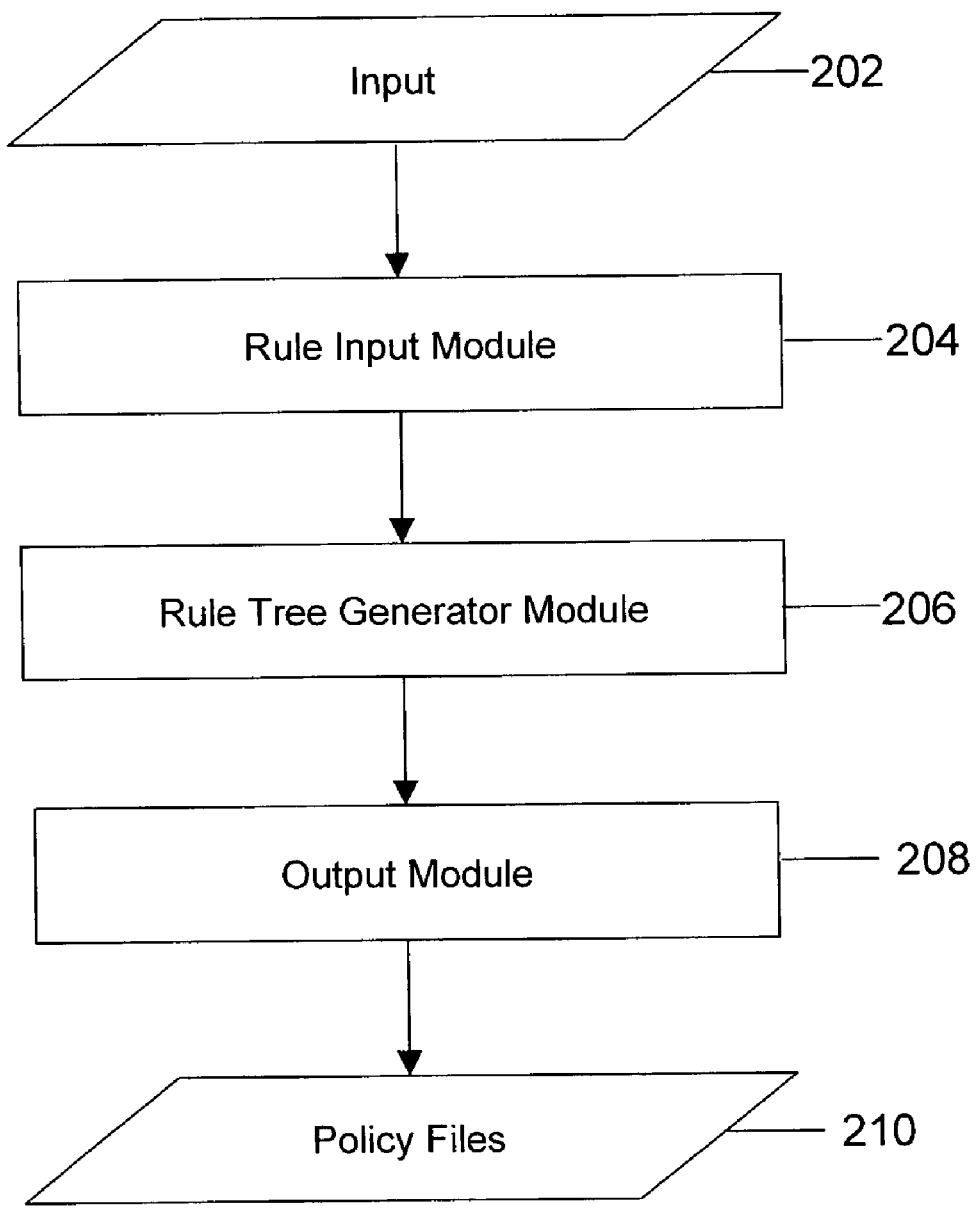
FIG. 2 is a block diagram of a rule compiler in accordance with an embodiment of the present invention.

FIG. 2 represents three sub-modules of the rule compiler. The first module is rule input module 204. Rule input module 204 receives input 202 for the rule compiler. The input to the rule compiler comprises rules and related information, which help in defining the rules. Rule input module 204 processes the input and converts it to a format that can be used by rule tree generator module 206 to generate a rule tree-graph.

Rule tree-graph has rules arranged in a tree-graph data structure. The rule tree-graph is a data structure comprising tree data structure and graph data structure. Such a data structure combines the properties of tree data structure and graph data structure. One skilled in the art will recognize data organized in form of tree data structure allows faster processing but requires large storage space, whereas data organized in the form of graph data structure requires less storage space but require high processing capabilities. The tree-graph data structure combines the properties of both, thereby increasing the processing speed and decreasing the requirement of memory space.

Output module 208 uses the rule tree-graph to generate policy files 210. The policy files give contents of memory for each of the modules of the policy agent. Input to rule compiler may comprise rules, an expression resource file, and multiple catalogues including but not limited to a time catalogue. The rules refer to information contained in these catalogues as values of different expressions. Expression resource file and the catalogues contain data that help in defining and modifying rules to a format that may be used to generate rule tree-graph. They may also contain information, which is required by various modules of the policy agent for processing the data packets.

A policy comprises one or more rules to be implemented on the data traffic. A rule can be defined as an action associated with a set of conditions. When the condition specified as part of the rule is true, then the action associated with the rule is performed. The action associated with the rules may be performed by one or more of the various modules of policy agent.

A condition is defined as a set of expression-value pair. The condition part of the rules may comprise various different expressions and values associated with these expressions. An expression specifies what needs to be tested, while the value specifies the value that the expression must have for that expression-value pair to be true. A condition is said to be true, if all the expression-value pairs in it are true.

An expression denotes a property of data packets, external conditions or other parts of the network, whose value determines the outcome of the condition. The expression may be a property of data packets, like source IP address or destination IP address of the data packet, or the direction of the packet, i.e. inbound or outbound. It may also be a property of external conditions like time. An expression can have multiple possible values.

The action part of a rule may specify the module of the policy agent, which is responsible for enforcing the particular action on network traffic. It may also specify the action that a module performs on fulfillment of the condition part of the rule. If the condition part of the rule holds true for a data packet, then based on the action part of the rule, the data packets is passed to the module of the policy agent responsible for implementing the action.

The policy agent may have many different modules. The examples of different modules include but are not limited to Firewall, IDS, QoS, URL, and VPN. Each of these modules gives different treatment to traffic stream based on the action, for that module, specified in the action part of the rule.

A rule may be illustrated as follows:

If (C) then (A); i.e. if condition 'C' is true, then do action 'A'.

The condition part of the rule may have several expression-value pairs associated with it.

It is possible that the condition part of the rule consists of or'ed expression value pairs. An or'ed expression value pair implies that the condition of the rule holds true when the expression takes any of the values mentioned in the or'ed expression-value pair.

An illustrative example of a rule is provided below. This is only an illustrative example and numerous combinations and modifications of the same are possible without any deviation from the spirit and scope of the invention.

```
/*************************************************************/
    RULE WEB_IIS_README_EML_ATTEMPT
    {
        IF
        ( PKT_DIR:INBOUND &
        SESS_DIR:INBOUND &
        L3:IP &
        L4:TCP &
        TCP_PROTOCOL:HTTP &
        TCP_HTTP_TXID:HTTP_CMD_GET &
    HTTP_PATTERN_MATCH:http_pattern_readme_eml_attempt
        );
        ACTION alarm, IDS;
        {
            (PACKET_BASED)
        }
    }
/*************************************************************/
```

The above rule contains seven expression-value pairs. All these must be fulfilled for the condition part of the rule to hold true. If the condition part of the rule is true, then the action defined by the action part will be performed.

In the above exemplary rule the action part of the above rule specifies 'IDS' as the module implementing the action. The action part also specifies the type of action as raising an alarm.

In all the rules associated with various modules the condition part of the rule works to identify the data packets on which the action needs to be taken. The process of identifying such data packets is common to all the modules of policy agent.

The expression resource file contains details regarding various expressions, which are used in the rules. It contains the names and description of different expressions that may be used in the rules and the possible values that the expressions can take. The data provided in the expression resource file is the source of all the expressions related information for the rule compiler. The expression resource file is extendable, i.e. the expressions and their details can be added to the expression resource file.

The description of an expression in the expression resource file may contain details regarding the various possible values of the expression. The value of an expression can be of the 'type' integer, boolean or string. The expression resource file may specify the 'type' of value the expression may take.

The values of expressions are extracted from the data packets, these are then checked for the fulfillment of conditions, and based on this check, actions are implemented on the data packets. The expression resource file may contain information regarding the location in the data packet from where the value of the expression may be extracted. It may also specify the kind of search required to match the value of the expression to the rules. It may further specify the size of the value of the expression. Such information though not required for the creation of rule tree-graph is essential for the overall functioning of the policy enforcement systems.

The expression resource file also contains the relationships between various expressions and values. The relationships represent the associations between various expressions and values. By way of an example, a value 'V1' is child of an expression 'E1' if 'V1' is one of the possible values of the expression 'E1'.

Figure 3:
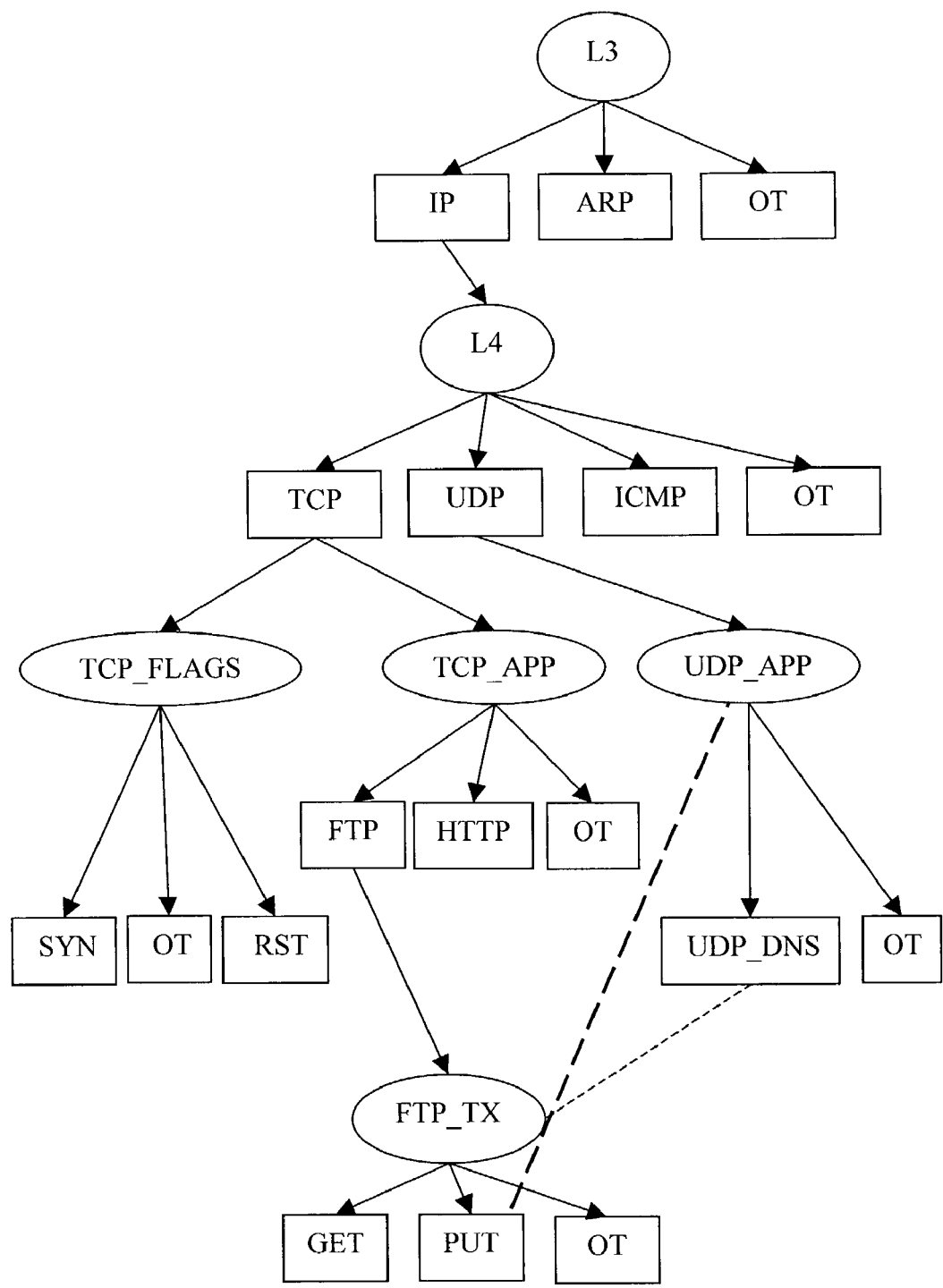
FIG. 3 illustrates a relationship structure between expressions and values in accordance with an embodiment of the present invention.

The relationship between various expressions can be illustrated by means of an expression value tree. FIG. 3 shows a pictorial representation of the expression value tree representing relationships between an exemplary set of expressions and values. In FIG. 3 expressions are represented by oval boxes and values are represented by rectangular boxes.

In FIG. 3 expression L3 has three different possible values. These are IP, ARP and OT. OT refers to all other values of expression L3, excluding IP and ARP. Value IP of expression has one child namely L4. Expression L4 has four possible values, which are TCP, UDP, ICMP and OT. Each of these values further has children expressions. FIG. 3 is an illustrative sample and shows relationships between a limited number of expressions values. In other situations the number of expression and their values will vary.

An expression is a child of a value of another expression. As in the case above L4 is child of IP, which is the value of the expression L3. It must be noted that more than one expression can be children of the same value, as is the case with TCP_AP and TCP_FLAGS in the above illustration.

Relationships between various expressions and values are captured by means of adjacencies or non-adjacencies.

The expression relationship helps in determining non-adjacencies between the expressions and expression-values. The non-adjacencies capture the relationships between expressions and help in eliminating many paths in the rule tree-graph, thereby making the rule tree leaner. Non-adjacency between an expression E2 and value V1 of different expression E1 implies that when expression E1 has value V1, then the possibility of having E2 as a child node of the subsequent children of E1 does not exist. This also implies that a logical path between E1 and E2 does not exist. Such paths when added to the rule tree-graph would never be taken. Removing such paths makes the rule tree leaner thereby decreasing the memory requirements to store the rule tree-graph, and also increasing the performance of the policy agent.

Adjacency is defined between an expression and a value of a different expression. The adjacency can be derived from the expression relationship in the following manner. An expression and a value of a different expression are said to be non-adjacent when traversed up the expression tree from the expression and the value in question, they meet at an expression node. Similarly, an expression and a value of a different expression are said to be adjacent, when traversed up the expression value tree from the expression and the value in question, they meet at a value node. By this definition, the expression-value FTP_TX:PUT and the expression UDP_APP are non-adjacent. Similarly, the expression-value UDP_APP: UDP_DNS and the expression FTP_TX are non-adjacent. However, the expression TCP_FLAGS is adjacent to the expression-value FTP_TX:GET, because when traversed up the tree, they meet at a value node. Dashed lines in FIG. 3 represent few exemplary non-adjacencies.

In FIG. 3 expression L3 has three different possible values, which are IP, ARP and OT. Similarly expression L4 has four possible values, which are TCP, UDP, ICMP and OT.

Evaluating the expression L4 has relevance only when the value of expression L3 is IP. Whereas when the value of expression L3 is ARP, evaluating expression L4 is unnecessary. Similarly TCP_APP as an expression is relevant, only when the value of expression L4 is TCP, while the UDP_APP as an expression is relevant only when the value of the expression L4 is UDP. The expression relationship establishes this kind of relationship between expressions.

The information of non-adjacency between the expression and an expression-value, coupled with the requirement of mutual exclusivity of values of expression help in creation of smaller, more compact tree, by eliminating the unnecessary nodes and edges in the rule tree-graph. This results in elimination of those paths, which are contrary to the relationships expressed in the expression resource file. A leaner rule tree improves the overall performance of rule processing.

The expression resource file may also contain information regarding category of the expression. All the expressions in the rule processing system are divided into three types of categories. These are session based, control based and data based. The session based category is the one, whose value remains unchanged for all packets of a session in a given direction i.e. the in-bound and the out-bound direction. The control based category is the one, whose value remains unchanged for all packets of a session in a given direction. The change in the direction is detected by the application decode module of policy agent, which then sends a control packet to the rule engine suggesting a change in the state of the application. The data based category is the one, whose value may change with each packet of a session.

The expression categorization helps in removing inefficiencies in the rule tree-graph. The expression categorization improves the efficiency of the system by exploiting the commonalities between various data packets. All the data packets belonging to same session will have same values for all the expressions that belong to the category session based, i.e. the value of these expressions will remain constant for all the packets of a particular session. Various modules of policy agent may capture the similarity between such data packets and use this information for processing the network traffic, thereby reducing the processing time and hence increasing the efficiency.

The details regarding expressions and values may also be provided in the rule-compiler code. The approach of providing the expressions in form of data input enables extendibility of the rule processing and compilation in supporting more expressions and is preferred over having them well known in the rule-compiler code.

An illustrative example of an expression specification in the expression resource file is provided. This is only an illustrative example and numerous combinations and modifications of the same are possible without any deviation from the spirit and scope of the invention.

```
/************************************************/
/* ICMP Type */
EXPRESSION ICMP_TYPE
{
    PARENT_EXPRESSION    = L4;
    PARENT_VALUE         = ICMP;
    VALUE_TYPE           = INT;
    SEARCH_TYPE          = INTMATCH;
    POSITION             = PACKET_EXTN;
    SIZE                 = 32BITS;
    CATEGORY             = DATA;
    OFFSET               = OFFSET_PACK-
                           ET_EXTN_ICMP_TYPE;
    MASK                 = MASK_PKT_EXTN_ICMPTYPE;
    SHIFT_VALUE          = 24;
    EXPR_TYPE_ID         = EXPRESSION_ID_ICMP_TYPE;
    APP_DEC_REQD_FLAG    = APP_DEC_REQD_NONE;
    VALUE ICMP_TYPE_0 (0);
    VALUE ICMP_TYPE_8 (8);
    VALUE ICMP_TYPE_3 (3);
    VALUE ICMP_TYPE_5 (5);
    VALUE ICMP_TYPE_11 (11);
    VALUE ICMP_TYPE_12 (12);
    VALUE ICMP_TYPE_13 (13);
```

-continued

```
    VALUE ICMP_TYPE_14 (14);
    VALUE ICMP_TYPE_15 (15);
    VALUE ICMP_TYPE_16 (16);
    VALUE ICMP_TYPE_17 (17);
    VALUE ICMP_TYPE_18 (18);
/************************************************/
```

In the above illustration of expression specification, expression name is specified along with the "EXPRESSION" keyword and is ICMP_TYPE. Expression name is a unique string, and is used to refer to the expression. No two expressions can have the same expression name. The expression name may be used elsewhere within the expression resource file, to specify the expression relationship with other expressions, or in the rule specification to specify the expression value as part of the rule condition.

The expression specification may also contain information regarding the category of the expression. In the illustrative expression specification the category of the expression is DATA.

In the illustrative expression specifications it is stated that the parent expression of the expression ICMP_TYPE is L4 and the parent value is ICMP, i.e. to say that the expression ICMP_TYPE is the child of the value ICMP of the expression L4.

The combination of rule input, time catalogue model and the description of participating expressions from the expression resource file effectively completes the definition of the rule, which is then compiled into binary policy files by the rule compiler.

Figure 4:
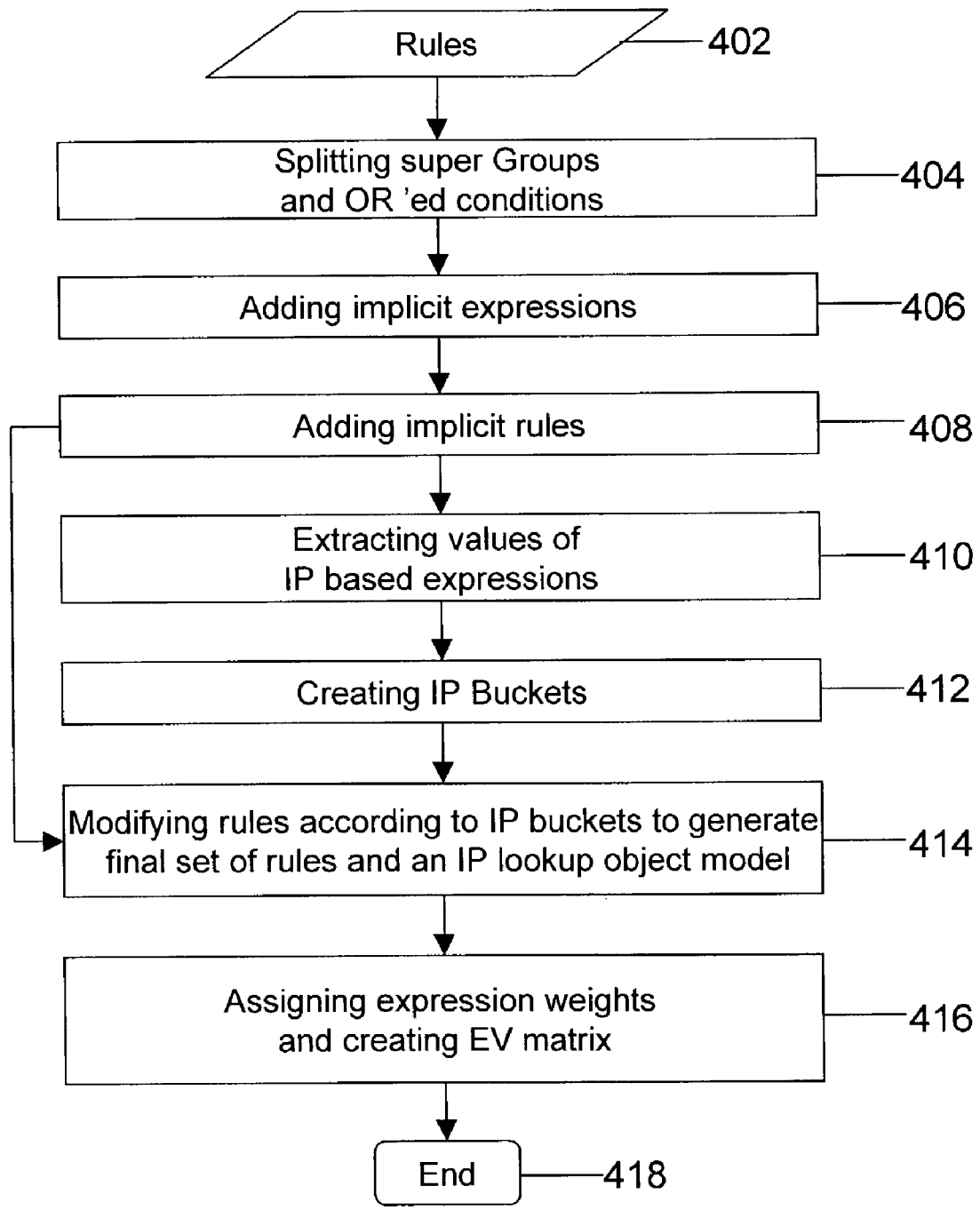
FIG. 4 is a flow chart that illustrates the various steps performed by rule input module on the input to the rule compiler in accordance with an embodiment of the present invention.

FIG. 4 is a flowchart that illustrates the various functions performed by the rule input module on the input to the rule compiler.

Rules 402 are input to the rule input module, the rules may be defined by a user via a Graphical User Interface (GUI) or may be obtained from a text file.

It is possible that a rule may allow an expression to have a range of values i.e. equivalent to an expression having any of the two or more different values. Such a rule consists of or'ed expression-value pair. The conditions of the rule will hold true when or'ed expression takes any of the values specified in the or'ed expression value pair. Such a rule may be specified, as multiple rules, which are all subsets of the or'ed rule.

For generating a rule tree it is important that all possible values, which an expression may take, are mutually exclusive of each other. This means that the value-set of the values that an expression may take should be such that when the expression takes any value in that set, it cannot subsequently also take another value in that set. This concept of mutual exclusion of values of an expression is central to the design of the rule processing system.

The rule-processing engine makes use of this property of the expressions and its values to eliminate the rules that require the value of an expression to be other than the value that the expression possesses.

Thus, the or'ed expressions cannot be directly utilized for generating the rule tree-graph, as this would imply that two paths of the rule tree would result in fulfillment of the same rule. To avoid the complications caused by this, the or'ed expressions are split and a new set of rules is created which is a subset of the original rule set.

A rule, which states a condition like:

Rule 1

If E1=x or y and E2=z, then do A

Where E1 and E2 are expressions associated with the conditions and x, y and z are respectively the values for the expressions.

The or'ed expression in the above rule can be removed by splitting the rule into following rules:

Rule 1a

If E1=x and E2=z, then do A; and

Rule 1b

If E1=y and E2=z, then do A.

Rules 1a and 1b, which have been created by splitting the or'ed expressions of rule 1 are mutually exclusive rules and are equivalent to the initial rule.

In case of certain expressions, all its values are not naturally mutually exclusive of each other. The examples of such expressions are SRC_IP (where ranges of IP are also allowed), TIME, TCP_FLAGS. In such cases the values and the rules are so modified to make the expression values mutually exclusive, either in the expression resource file or dynamically by the rule compiler. This conversion to mutually exclusive set of values for an expression is critical to the creation of rule tree-graph by the rule compiler.

At step 404, the rule input module modifies the input rules by splitting or'ed conditions to obtain a modified set of rules.

The rules that are input to the rule complier may contain incomplete data. Some of the conditions of the rule may implicitly cover other conditions, which may not be specified as a part of the rule.

For example, if a rule requires the TCP_APPLICATION to be HTTP, by stating this condition as part of the rule, it is implicit that L4 has to be TCP and L3 has to be IP, and these conditions need not be specified. However, the rule compiler needs all conditions specified for creation of rule tree-graph.

At step 406, the input rule module, of the rule compiler, adds all missing implicit conditions to the rule with the help of the expression value relationship tree.

At step 408, the rule input module adds implicit rules to the modified rule set. These rules may be related to counting the packets belonging to a particular customer or any other such rule. Such rules are not input by the user rather these rules are implicitly added by the rule compiler for internal purposes like maintaining counters.

The rules to be implemented on the data packets may have expressions, which may take a range of IP addresses as values. And a rule may hold true for a range of IP addresses. Two rules may be written that have an overlapping range of IP as conditions. As the expressions in the rule tree-graph should have mutually exclusive values, these two ranges cannot go as two different values for the expression representing the check on the IP address. Such overlapping IP ranges betray the condition of mutual exclusivity.

The rule tree-graph data structure requires all the possible values, which an expression may take, to be mutually exclusive. This means that the value-set of the values that an expression may take should be such that when the expression takes any value in that set, it cannot subsequently also take another value in that set. This concept of mutual exclusion of values of an expression is central to the design of the rule processing system. To overcome this problem, mutually exclusive IP buckets are created. These IP buckets may have either one IP address or a range of IP addresses, such that each of the buckets is mutually exclusive and take care of the all the given set of rules. The process of IP bucketing can be better understood with the help of FIG. 5 and FIG. 6.

FIG. 5 illustrates an exemplary set of IP addresses that may be the values of the IP bases expressions in a rule set. In the given exemplary set, the IP addresses are not mutually exclusive. IP1, IP3, and IP4 overlap with IP2, while IP5 does not overlap with any other IP address.

IP bucketing logically divides the given IP ranges into mutually exclusive IP buckets as shown in FIG. 6. FIG. 6 illustrates mutually exclusive IP buckets generated from the given set of IP address range. The first column of the table represents the bucket, second column represents the IP ranges corresponding to each bucket and third column represents the initial IP ranges, which are contained in the corresponding buckets.

The IP addresses have been bucketed to create minimum number of IP buckets, which are mutually exclusive. The initial set contained five sets of IP addresses, after IP bucketing seven sets of buckets have been obtained.

At step 410, the rule input module extracts IP based expressions and their values from the rules and creates mutually exclusive IP buckets at step 412.

At step 414, the rule input module modifies the rules according to the IP buckets and creates an IP bucket lookup object model.

In a rule tree, if the nodes with expression category as session based, are above the nodes with expression category as control based and the nodes with expression category as control are above the nodes with expression category as data based, then this would ensure that duplication of processing effort for data packets is reduced.

To exploit the commonalities of values for data packets, expression weight criteria is used to decide the position of an expression in the rule tree-graph.

The expression weight is not a predetermined value that forms a part of the expression specification. Rather, expression weight is computed by the rule compiler from other fields. The fields that may be used to determine the expression weight include, but are not limited to expression category, expression search type and the repetition count of the expression in rules. The expression weight determines the position of the expression in the rule tree-graph. The expression with higher weight occupies a node, which is nearer to the root of the tree.

The nodes that contain expressions with category as session based always have to be above the nodes containing expressions with category as control based and the nodes containing expressions with category as control based have to be above the nodes containing expressions with category as data based in the rule tree. This sequence is ensured using the expression weight. The weight for the expression category for determination of expression weight is kept very high to ensure this sequence. The equation below may be used to calculate the expression weight:

$$Expression\_Weight = Category\_Weight\_Factor * category + Frequency\_Weight\_Factor * Frequency + Search\_Weight\_Factor * Search\_Type\_Difficulty$$

In this example the values are:

$$Category\_Weight\_Factor = 1000$$

$$Search\_Weight\_Factor = 10$$

Frequency_Weight_Factor = 1

The weight factors specified are notional, different weight factors may be assigned. A person skilled in the art will realize that weight factor must be assigned such that it takes care that a session based expression always has higher weight than control based, and control based expression has weight higher than a data based expression.

In a rule tree-graph it is important that more relevant expressions get evaluated before the less relevant expressions. The relevance of the expressions may be a factor of the type of expression, the occurring frequency of the expression in the given set of rules. Such an expression coming higher up in the tree portion of the rule tree-graph implies that rules that eliminated at an earlier stage thereby reducing the processing overload.

At step 416, the rule input module calculates the weights of the various expressions used in the rules, and creates an expression-value matrix.

The rules to be implemented on the data packets can be defined by the users or provided by some other means. For example the rules related to firewall may be defined by the users via a graphical user interface whereas the rules related to IDS may be used from a database of such rules.

In case of IDS, the user may have no means or sufficient knowledge to write rules for intrusion attacks. The rules for IDS attacks may therefore be provided as rule input from the expression resource file or a directory of rules. These signature rules may be written into a separate file called IDS signature input file. The format of the IDS signature input file might be different from the format of the other rules. The IDS signature file may then be converted to required format by a pre-compiler. The pre-compiler for expression resource file and the signature input file understands the structure of a rule and also identifies it to be an IDS rule, because of the IDS action supplied with the rule. The pre-compiler that compiles the input expression resource file and the IDS signature file may also be called "Signature Generator". The pre-complier may form part of the rule input module or may even be separately provided.

Another important step involved in creating the rule tree is identifying the adjacencies between various expressions and values. The information regarding adjacencies between the expression and an expression-value, coupled with the requirement of mutual exclusivity of values of expression helps in creation of leaner, smaller and a more compact tree. A leaner rule tree leads to a better performance of the policy agent.

The information regarding non-adjacencies between participating expressions is obtained by the rule compiler before it creates the rule tree-graph. The non-adjacencies help eliminate a lot of paths, which would never be taken and so it makes the resulting tree much leaner. The tree generation algorithm is interested in the relationship of non-adjacency between an expression-value and another expression. This relationship helps the algorithm in determining the next expression that must be inserted into the rule tree-graph.

Rule input module obtains non-adjacencies between various expressions and values. The step of adding adjacencies is illustrated in flowchart depicted in FIG. 7.

Figure 7:
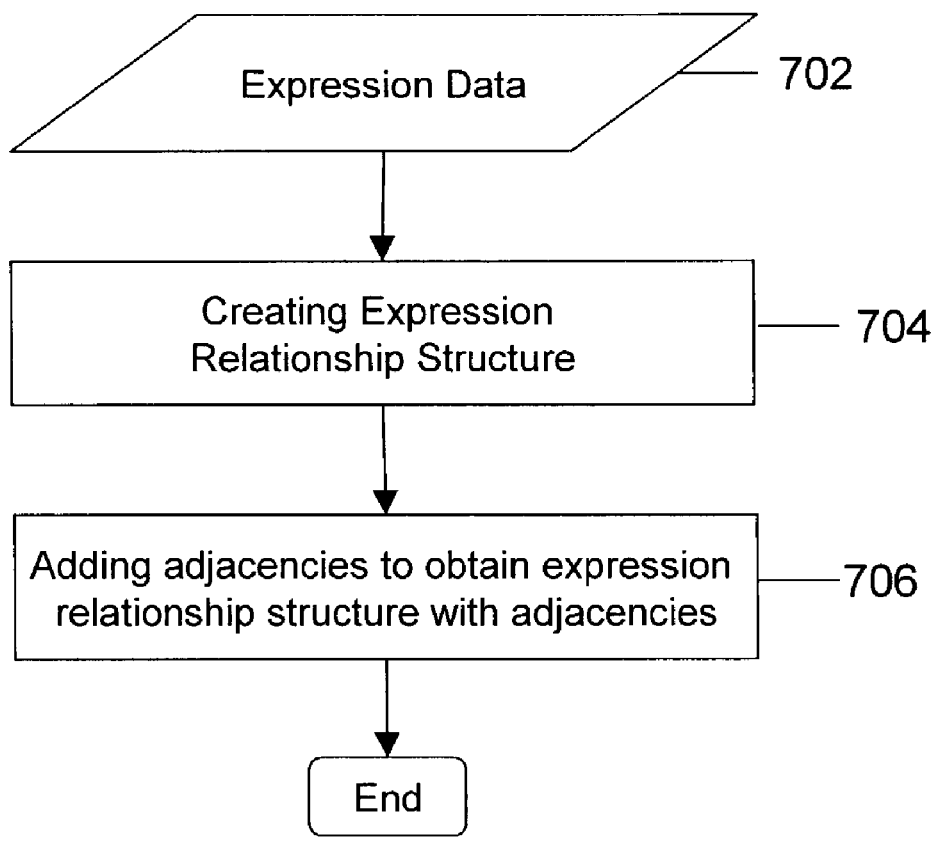
FIG. 7 is a flowchart that illustrates a method of adding adjacencies to the Expression value tree in accordance with an embodiment of the present invention.

FIG. 7 illustrates the process of adding adjacencies to the expression value.

Figure 9:
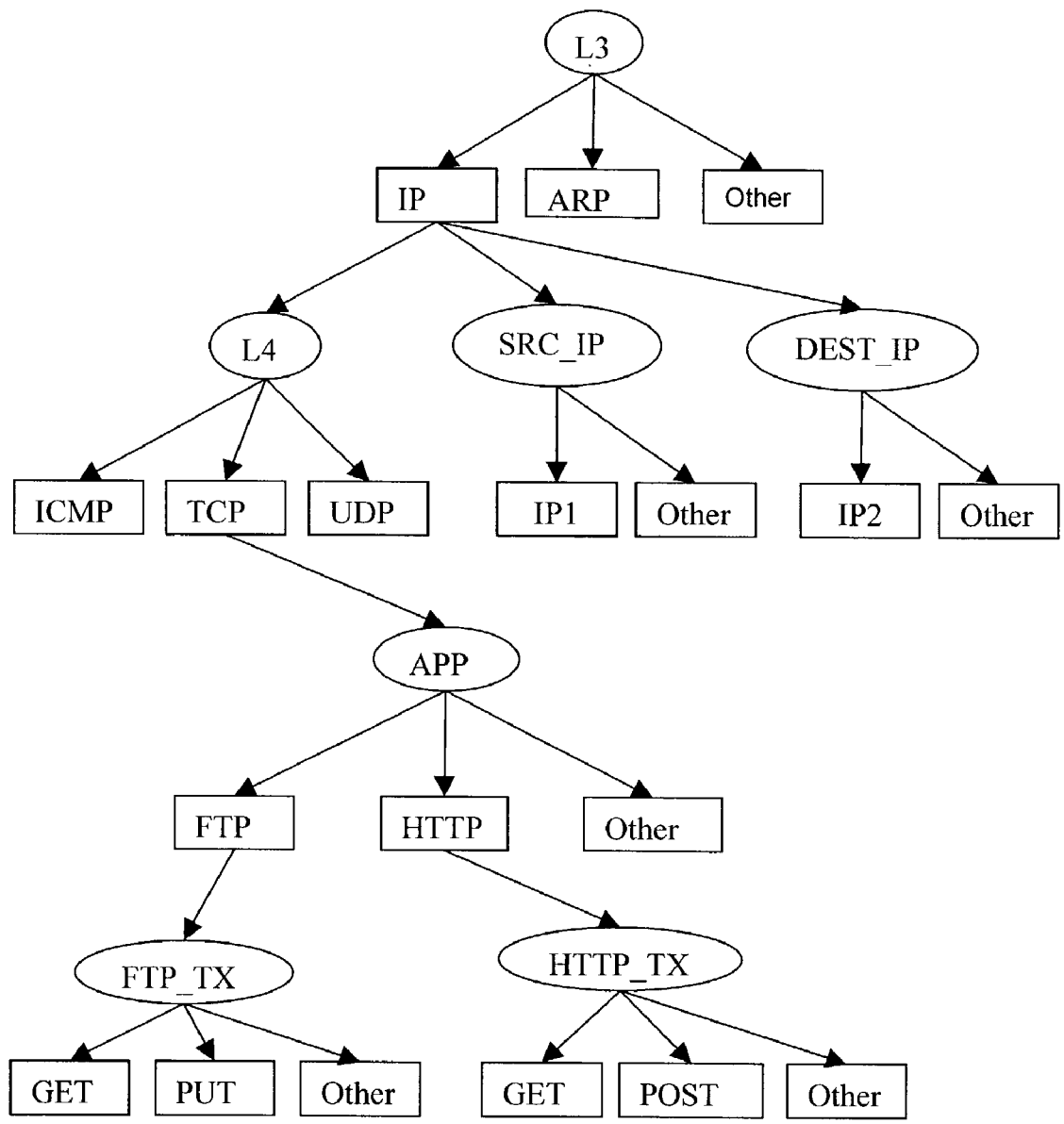
FIG. 9 illustrates an expression value tree in accordance with an embodiment of the present invention.
Figure 10:
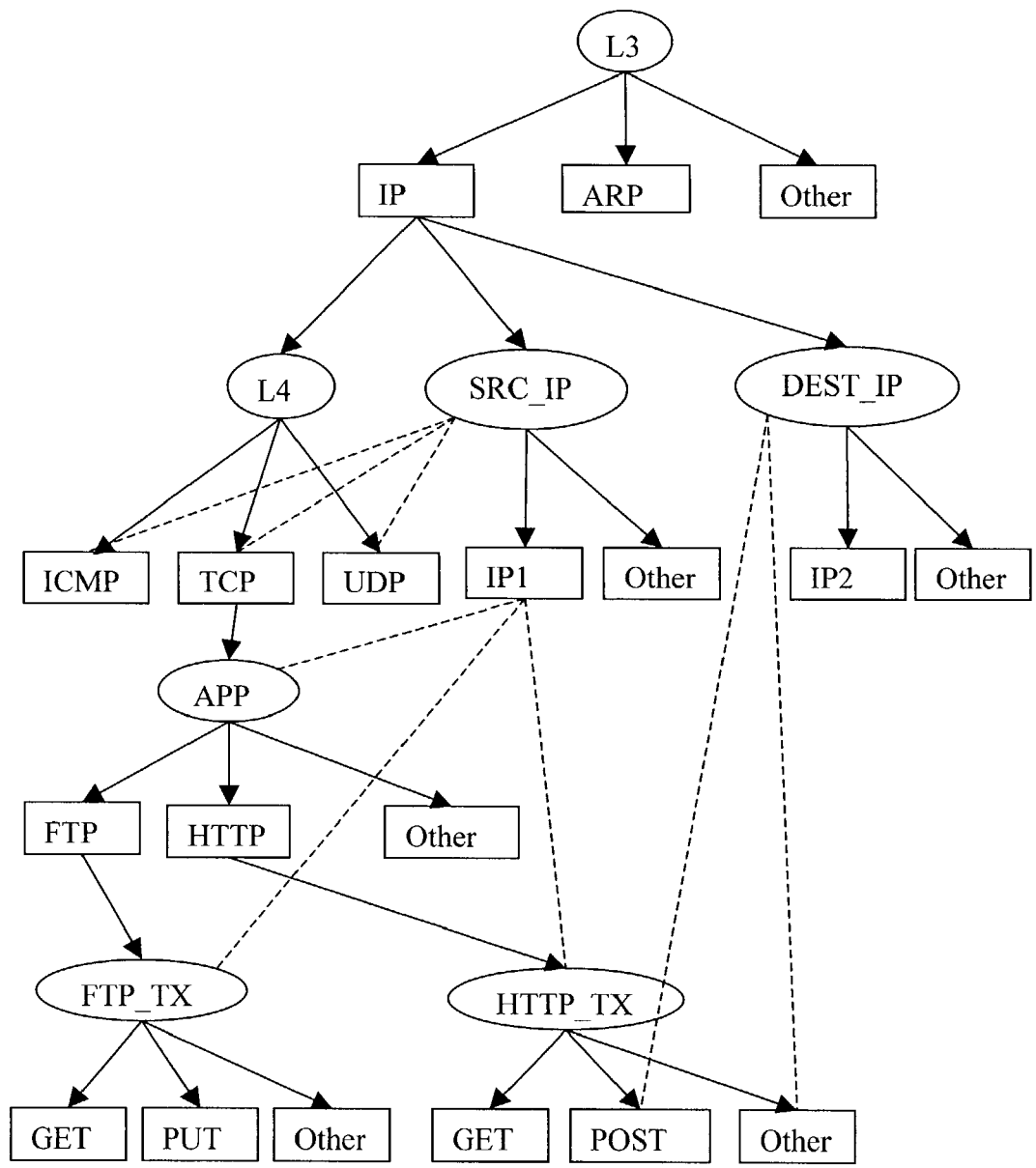
FIG. 10 illustrates an expression value tree with some exemplary adjacencies added in accordance with an embodiment of the present invention.

Expression values are taken as an input at step 702. At step 704, an expression value relationship structure is created. This structure may be an expression-value tree as shown in FIG. 9. At step 706, adjacencies are added to the expression value relationship structure. Expression value relationship structure with added adjacencies may be represented as an expression-value tree with adjacencies added as is shown in FIG. 10.

The adjacencies may be determined in two different ways. They can be determined through the expression relationship and also through statically configured relationship. These are explained in detail below.

The expression relationship helps determine non-adjacencies between the expressions and expression-values. The expressions are arranged in a relationship with one-another, in that an expression A would be child of a Value of another expression B. In the exemplary illustration of an expression value tree of FIG. 9, expression HTTP_TX is a child of value HTTP of expression TCP_APP. This is because evaluating HTTP transaction is relevant only if the application is HTTP. The rule compiler establishes that expression HTTP_TX is not adjacent to the value FTP of expression TCP_APP.

The adjacencies may also be derived through static configuration. The non-adjacency derived from the expression relationship exposes naturally evident non-adjacencies. A few other non-adjacencies exist, that may not be described by the expression relationship, but still are true. For example, the expression TCP_FLAGS and the expression HTTP_PATTERN_MATCH, both are descendents of the value TCP of the expression L4. Therefore, through expression relationship they are adjacent. However, a TCP SYN does not carry any application payload, and therefore if the engine figures that a packet is a SYN packet, even though it is an HTTP packet, it does not need to do pattern match on it.

This information, though not evident from the expression relationship can be stated separately. The rule compiler takes advantage of this knowledge by taking into account the stated non-adjacency and thereby creating a leaner tree-graph. The rule engine derives this benefit in performance, as it does not now encounter the HTTP_Pattern node for the syn packet.

Once the adjacencies/non-adjacencies have been identifies for the various expressions and values, this information is then used to create an Expression Value matrix (EV matrix) as shown in FIG. 12.

Henceforth, the whole process of rule compilation is illustrated in the following figures with help of exemplary set of rules. FIG. 8 shows the set of rules used for the purpose of illustrating the rule compilation process.

FIG. 8 is a table representing a set of eleven rules. Second column of the table represents the rule. Third column illustrates conditions associated with the rules and fourth column illustrates the actions associated with these conditions. The action part of the rules also indicates the module of policy enforcement system to which the rule applies.

The given set of rules does not contain any or'ed expressions or overlapping IP buckets. This rule set thus, does not require splitting the rules for or'ed expressions or creating mutually exclusive IP buckets.

An expression-value relationship structure is created between the various expressions used in the rules and their possible values. The information regarding these expressions may be obtained from the expression resource file.

FIG. 9 represents an expression value tree created for the expressions used in the rules. The expression value tree is created for only those expressions and values that occur in the given rule set.

The rule compiler obtains the adjacencies between the various expressions and values and adds them to the expression-value relationship structure. FIG. 10 shows an expression-value tree with some sample adjacencies added in dotted lines.

To create a rule tree for these rules, expression weights are required as expression weights decide the position of various expressions in the rule tree-graph. FIG. 11 is a table depicting values of expression weights of the various expressions. Various expressions used in the given sample rule set are extracted. These expressions are represented in the second column of the figure. The third column represents the frequency of occurrence of these expressions in the rule set, i.e. the number of rules that use these expressions as a part of their condition definition. The fourth column represents the category of the expressions; a category weight factor is assigned to the expression on the basis of the category, this category weight factor plays an important role in weight calculation. The fifth column mentions the type of search that is required to be conducted for matching the value of expression to the rules. The sixth column represents the expression type weight. The seventh column mentions the search type weight; it reflects the ease with which the value of the expression can be matched with the expression value pair of the rule. The eighth column represents the occurrence weight for the expression. The above notations are exemplary and many combinations and variations of the same are possible without any deviation from spirit and scope of the invention.

All these may be used to calculate the weight of the expression represented in column 9. By way of an example, following equation may be used to calculate the weights:

Expression_Weight=Category_Weight_Factor*category+Frequency_Weight_Factor*Frequency+Search_Weight_Factor* Search_Type_Difficulty It will be evident to one skilled in the art that numerous modifications of such an equation are possible without deviating from the spirit and scope of the invention.

The weights stated in column 6, 7, and 8 may be calculated as per formulas given below:

"Expr Type
 Weight"=Category_weight_Factor*category

"Search_Type
 Weight"=Search_Weight_Factor*Search_Type_Difficulty

"Occurrence
 Weight"=Frequency_Weight_Factor*Frequency where,

Category_weight_Factor=1000

Search_Weight_Factor=10

Frequency_Weight_Factor=1

The value assigned to 'category' and 'Search_Type_Difficulty' are dependent on the expression category and the type of search required to match the value of the expression respectively. In the above case the following values have been assumed:

If the category of the expression is 'session', then value of category=2

If the category of the expression is 'control', then value of category=1

If the category of the expression is 'data', then value of category=0

If the search type if 'IntMatch', then Search_Type_Difficulty'=1

The weight factors and values specified are notional and can be replaced by different weight factors without deviating from the scope of the invention. These weight factors may be taken as input to the rule compiler or they may be defined in the code of the rule compiler.

The expression weights are used to create an Expression Value matrix (EV matrix) represented in FIG. 12. This EV matrix is input for the rule tree generator module.

EV matrix is generated from the given set of rules. In the EV matrix rows represent the rules and the columns represent the various expressions. EV matrix has as many rows as the number of rules in the final set of modified rules. It also has as many columns as the number of expressions used in the set of rules. Each cell of the matrix represents the value of the expression corresponding to a particular rule. Each cell in the EV matrix represents the value that the expression, represented by the column to which the cell belongs, must take for the rule represented by the row to which the cell belongs, to be satisfied. FIG. 12 represents the EV matrix created for the given set of rules. The expression weights play a part in creation of this matrix as the different expressions are arranged in the columns of the EV matrix in the decreasing order of the expression weight.

In EV matrix, the first column represents the various rules, which are required to be compiled by the rule compiler. The other columns represent the various expressions that are used in defining the conditions associated with the rules. Rules and the associated conditions are represented by the rows. The cells of the matrix represent the various values that the expressions can take for the corresponding rule.

All the rules do not use all the expressions that are present in the EV matrix as a part of their condition definition. The expressions that do not have a value predefined by the particular rule are assigned a value 'Do Not Care' represented by '*' or 'Not Applicable' represented by 'NA'.

'Do Not Care' (*) value is assigned to expressions, when the expressions make no difference to matching of a rule. For way of an example, the rule R5 comprises of two conditions L3=IP and SIP=IP1. The rule R5 is not affected by the values of other expressions namely L4, DIP, APP, FTP_TX, and HTTP_TX. Irrespective of the values of the values of other expressions, the rule R1 gets matched when the other conditions specified as part of the rule R5 are matched. Thus, for the rule R5, the value of all other expression are said to be 'Do Not Care'.

While creating the rule tree-graph, the rules having 'Do Not Care' in a cell, tend to get into all the reduced EV matrices, corresponding to different branches for different expression-values at that node.

Expressions are assigned value 'Not Applicable' (NA) when the expressions have no significance or do not make any difference for evaluation of a certain rule. For example, when a rule is satisfied for HTTP protocol, then the value of the expression "FTP Transaction" has no significance and makes no contribution towards evaluation of that rule. Such relationship is indicated by the non-adjacencies of an expression with respect to value of another expression. The rule compiler populates the cells that represent non-adjacency with 'NA'. In the exemplary rule set, the rule R3 is for a protocol other than FTP, and therefore the cell representing FTP-Transaction for R3 is populated with NA.

While creating the rule tree-graph, the rules having 'NA' in a cell, tend to get eliminated in the reduced expression-value matrix. This reduces the size of the resulting reduced matrix and causes faster convergence in the expression-value tree-graph. Efficient identification of all NAs in the matrix is therefore very important for construction of a leaner expression-value tree-graph, which has a direct impact on performance of both the rule compiler and the rule engine.

The expressions are arranged in descending order of weights in the EV matrix, i.e. expression L3 has a higher weight than L4; L4 has higher weight than DIP, and so on.

Figure 13A:
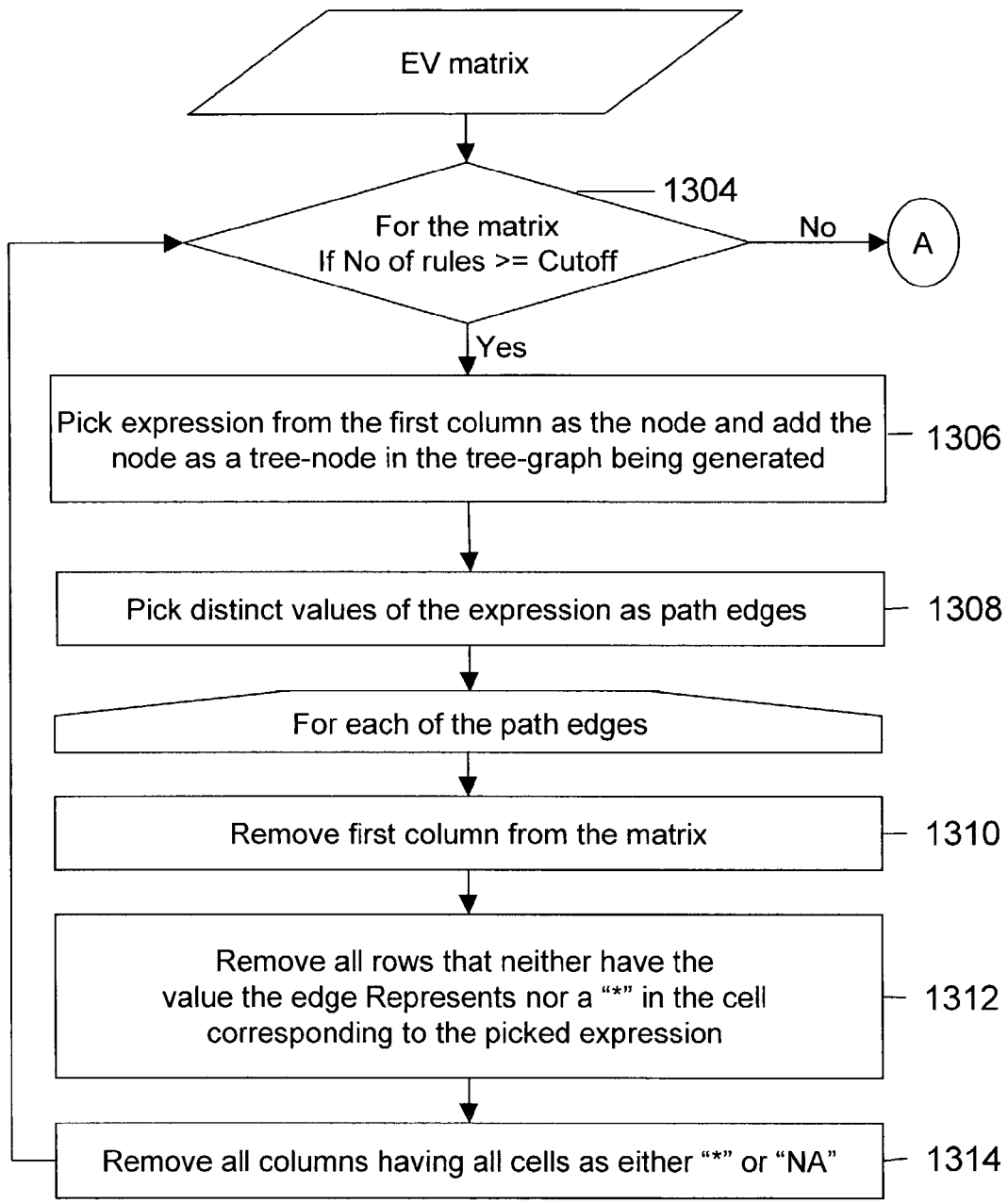
FIG. 13a and FIG. 13b represent a flow chart that illustrates steps of tree-graph generation in accordance with an embodiment of the present invention.
Figure 13B:
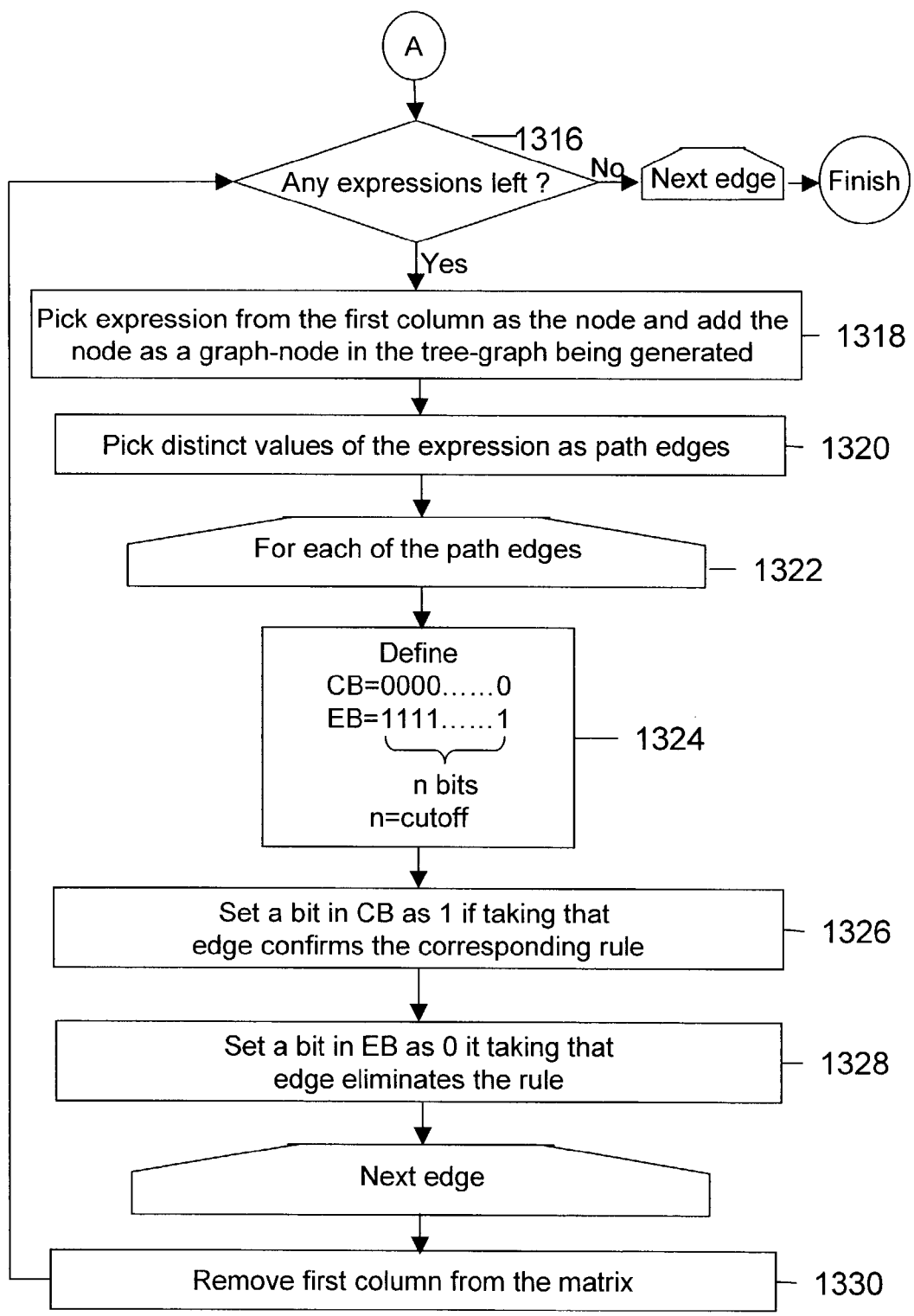

Rule tree generator module 106 uses the EV matrix to create the rule tree-graph. The tree generation process is illustrated by a flowchart in FIGS. 13a and 13b.

The rule compiler generates the rule tree-graph from the EV matrix. The rule tree-graph is a mesh of path nodes and path edges.

The rule tree-graph is arranged as a tree of path nodes, connected by path edges on the top. Each leaf level path edge of this tree leads into a graph, which consists of path nodes and path edges arranged as a mesh.

The tree generation process starts from the EV matrix. The EV matrix may be converted to a tree or graph; this is dependent on the size of EV matrix. The size of the EV matrix can be expressed in form of number of rules represented by the EV matrix. If the number of rules in the EV matrix is more than a predefined value i.e. the 'cut off value', then the tree algorithm will be applied to the EV matrix; otherwise the graph algorithm will be applied to it. The predefined value may be defined by the user or may be provided in the code of the rule compiler.

At step 1304, the EV matrix is compared for the number of rules against the predefined value. If the number of rules is less then the predefined value, which has been taken as six in this case, then the graph algorithm depicted in the flowchart illustrated in FIG. 13 b is applied to the EV matrix. If the number of rules is more than six, then the tree algorithm is applied. In case of tree algorithm, the expression from the first column of the EV matrix is picked up as the node of the tree at step 1306. At step 1308, various values of the expression are picked as distinct edges of that node. For each of the path edges the first column of the matrix is removed from the matrix at step 1310. For each of the path edges all the rows that neither have the value corresponding to the edge nor have a '*' in the cell corresponding to the expression are removed from the matrix at step 1312. At step 1314, all columns having all the cells as '*' or NA are removed. This results in creation of 'n' number of reduced matrices. Here 'n' represents the number of distinct edges from the node. To all these distinct 'n' matrices the rule tree algorithm is applied.

If the number of rules in the reduced EV matrix reduces below six, then the graph generation algorithm is applied to the reduced EV matrix. At step 1316, the system checks if any expressions are left in the matrix. If expressions are left then the expression from the first column is picked as node at step 1318. At step 1320, distinct values of the expression are chosen as path edges. For each of the path edges 'Confirmation Bitmap' (CB) and 'Elimination Bitmap' (EB) are initialized at step 1322. CB represents the confirmation bitmap, each rule is represented by a bit in the CB and the corresponding bit is assigned value '0' if the rule is not confirmed, and assigned value '1' if the rule is confirmed. EB represents the elimination bitmaps; each rule is represented by a corresponding bit. The bit is assigned a value '0' if the rule is eliminated by taking the path edge else it is assigned a value '1'. At step 1324, all the bits of the CB are assigned value '0' and all the bits of EB are assigned value '1', representing that none of the rules to be tested have been confirmed or eliminated.

At step 1326, the value of CB is set '1' if taking the edge confirms the corresponding rule. Similarly at step 1328, EB is assigned a value '1' for the rules, which get eliminated on taking that edge. Once CB and EB have been assigned for a particular edge, next edge is picked and a similar process is repeated for that edge. Once all the edges of the node have been processed, the column containing these edges is removed from the matrix at step 1330.

Figure 14:
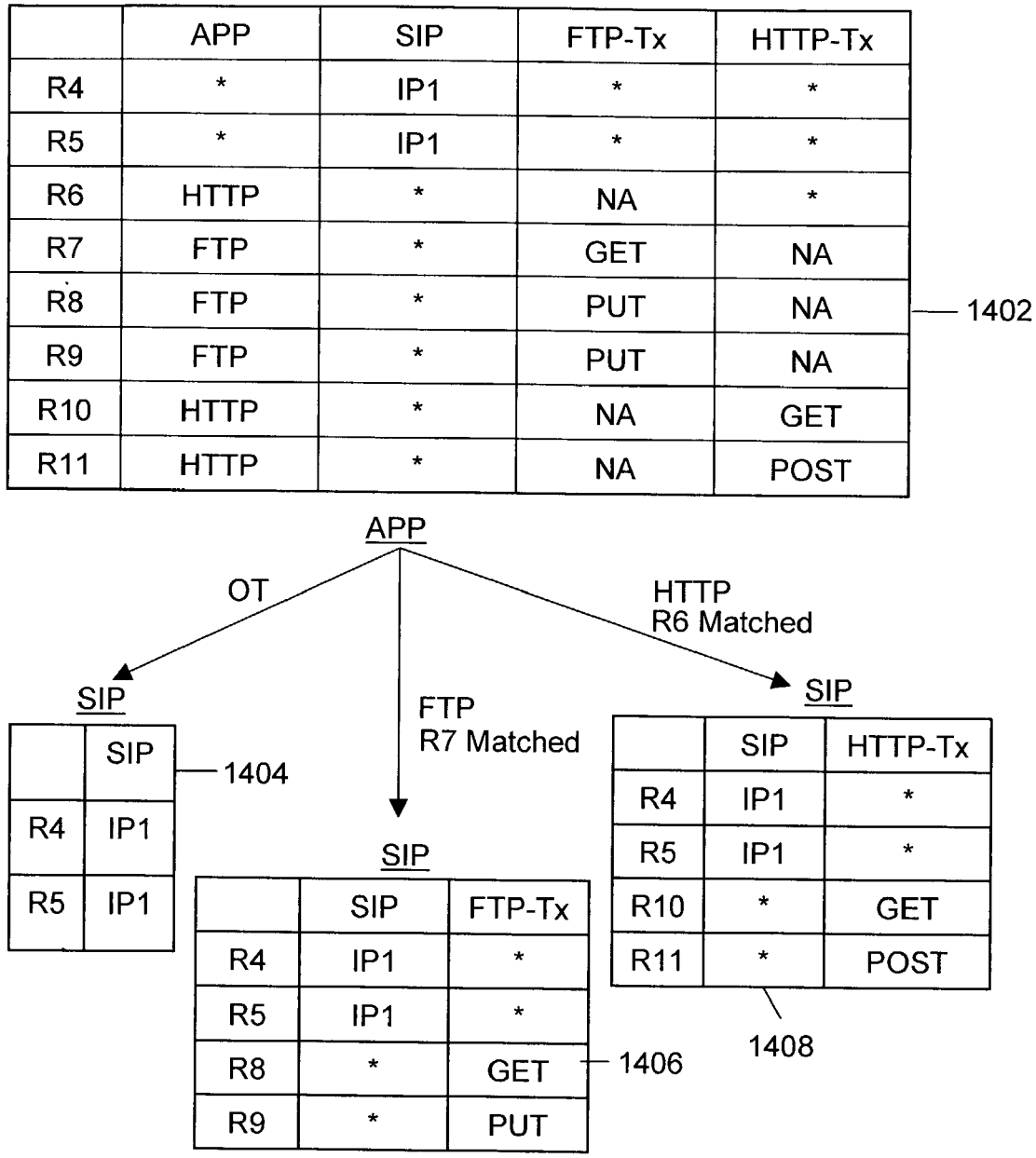
FIG. 14 illustrates a reduced EV matrix and steps of reduction in Expression Value matrix in accordance with an embodiment of the present invention.

The process of tree-graph generation is illustrated in FIG. 14 with the help of a reduced EV matrix 1402. EV matrix 1402 is a subset of the EV matrix represented in FIG. 12. The algorithm depicted in FIG. 13 a and 13 b is applied on the matrix. The rule compiler compares the number of rules left in the matrix with the cutoff value, which are six in this case. As the number of rules is more than six (eight in this case), so the expression of the first column of the EV matrix i.e. APP is picked up as the node. Distinct values of the expression that are FTP, HTTP and others are picked up as distinct path edges. For each of the path edges, a reduced EV matrix is created. Corresponding to FTP, HTTP and others, reduced EV matrices 1404, 1406 and 1408 are respectively created.

For each of the path edges second column of the EV matrix represented in 1402 is removed. All the rows that do not correspond to the particular value of the expression or have '*' or 'NA' as the values, are also removed. All the columns having all the cells as either '*' or 'NA' are also removed. The same action is continued recursively on new nodes (reduced EV matrix) created. This action is continued till the number of rules in the reduced EV matrix is more than the cut off value. When the number of rules in the reduced EV matrix reaches below cutoff value of six, the reduced EV matrix is converted into a graph.

The conversion of EV matrix to a graph below a certain cutoff value prevents the exponential increase in memory requirements of the policy agent.

Figure 15:
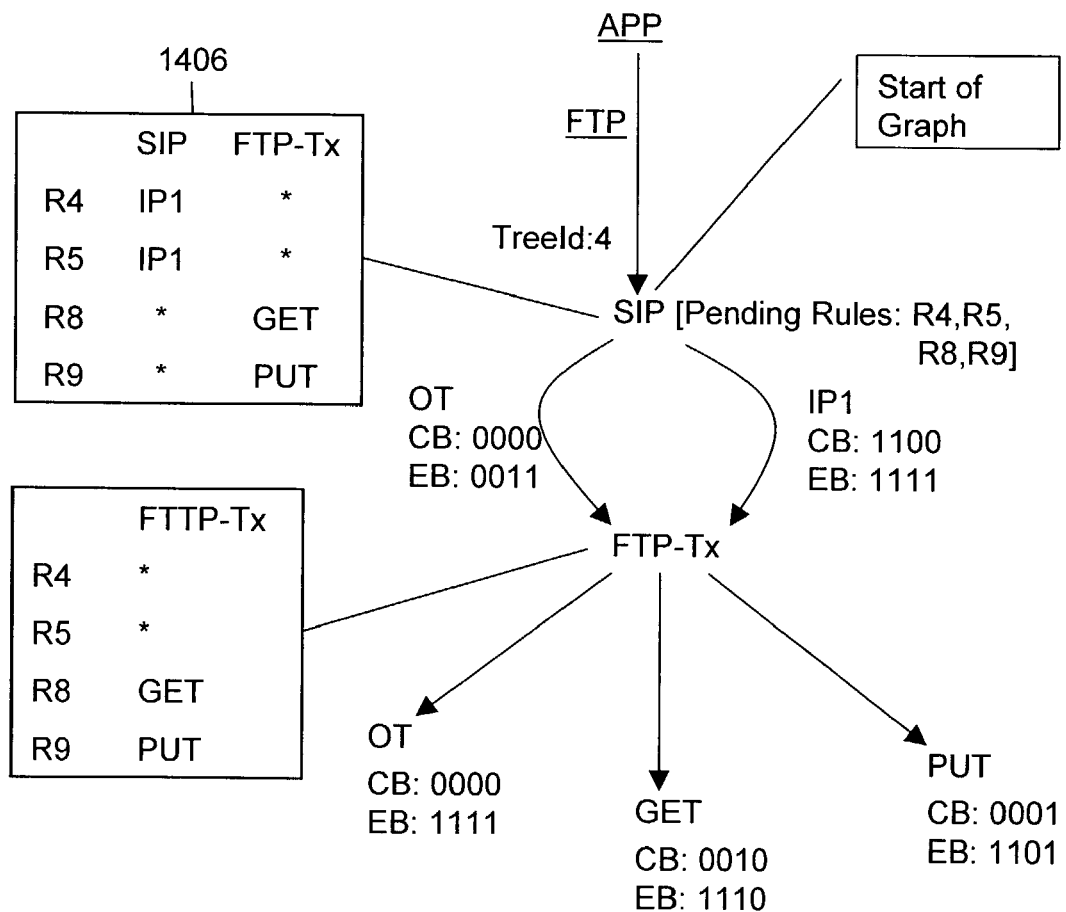
FIG. 15 illustrates generation of a graph in accordance with an embodiment of the present invention.

FIG. 15 represents graph generation from a reduced EV matrix. Reduced EV matrix 1406 has been used for the purpose of illustration. The graph generation starts when a start of graph has been identified. For the purpose of illustration the start of graph this case is SIP. The start of graph is a node, at which the non-eliminated rules (rows left in the reduced EV matrix at that node, 4 in this case) have reduced to less than or equal to a cut off value. For this example, a notional cut off value of six has been taken.

At the start of graph node, the graph creation logic is left with a few un-eliminated rules, called pending rules. The pending rules in this illustration are R4, R5, R8 and R9.

Unlike a tree where the rules in the reduce EV matrix get reduced, in a graph, as one goes from one path node to the next, only the expressions get reduced, the rows do not get reduced.

Assume that each of the rules R4, R5, R8 and R9, represent a bit in a bitmap of, say 4 bits. A person skilled in the art will realize that a bitmap of different size can be used without deviating from the spirit and scope of the invention.

Two bitmaps are computed for each edge, these are Confirmation Bitmap (CB) and Elimination Bitmap (EB). In this example each bitmap is of 4 bits. A bit in the CB is set to 1, if taking that edge confirms the corresponding rule, while a bit in the EB is set to 0, if taking that edge eliminates the rule corresponding to the bit. FIG. 15 illustrates the assignment of values to CB and EB for various edges of the graph.

The starting point of the graph in the FIG. 15 is SIP. Two edges namely OT and IP1 are possible from this starting point. If the edge OT is taken then no rule gets fulfilled and therefore CB is assigned value '0000'; whereas on taking this edge rules R4 and R5 get eliminated therefore, the bits corresponding to these rules are assigned value '1' in the EB. The EB now has the value '0011'. For the other edge IP1 the values of CB are '1100' as rules R4 and R5 get confirmed on taking this edge. The values of EB are '1111' as no rules get eliminated on taking this edge.

The next node taken after the node SIP is FTP-TX, which is represented by the next column of the EV matrix 1406. Three edges namely OT, GET and PUT are possible from this node. CB and EB are calculated for each of these edges.

These bitmaps are useful in matching the final rules and are important to the functionality of rule engine module of the policy agent.

Figure 16:
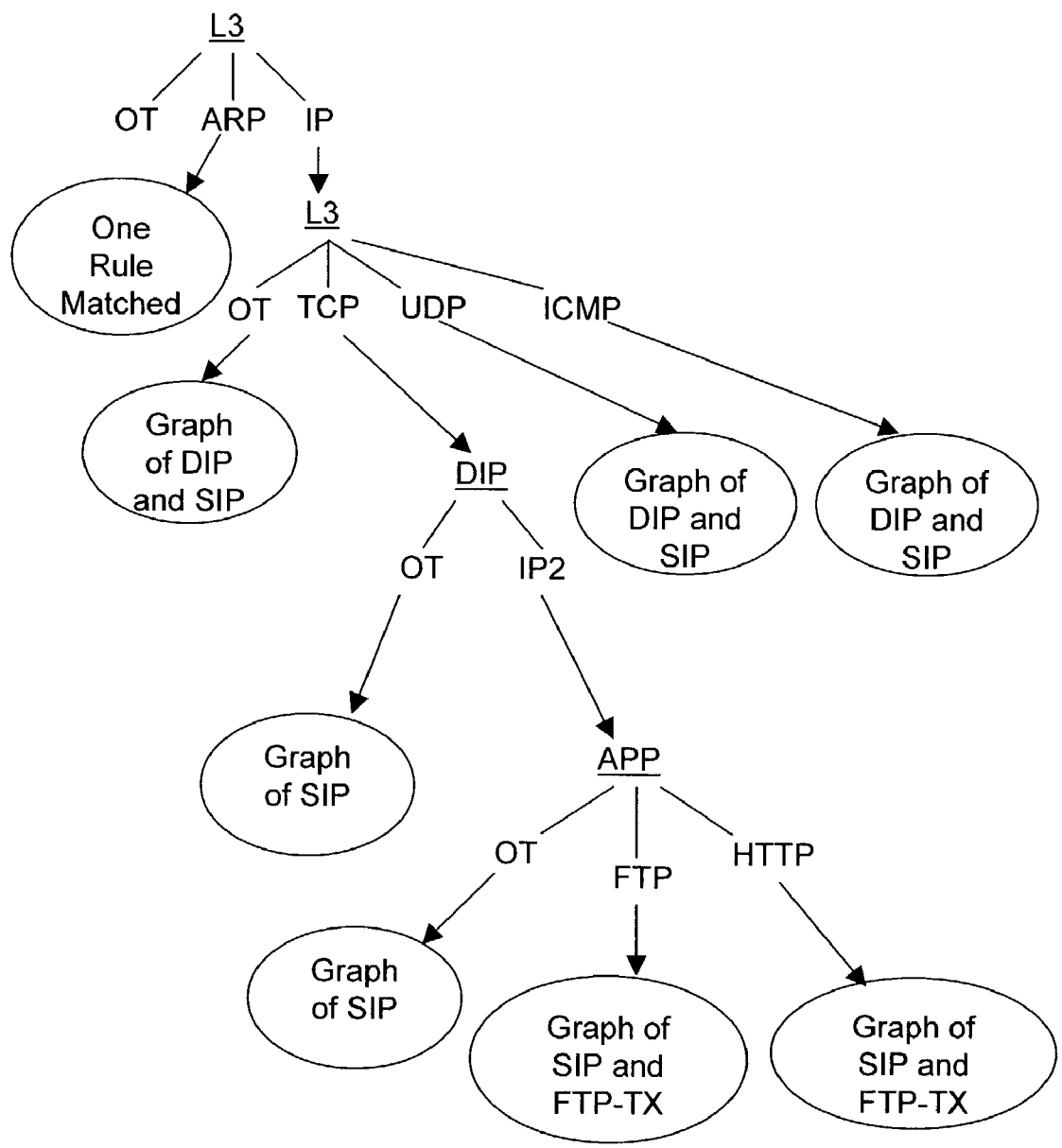
FIG. 16 illustrates a rule tree-graph in accordance with an embodiment of the present invention.
Figure 17:
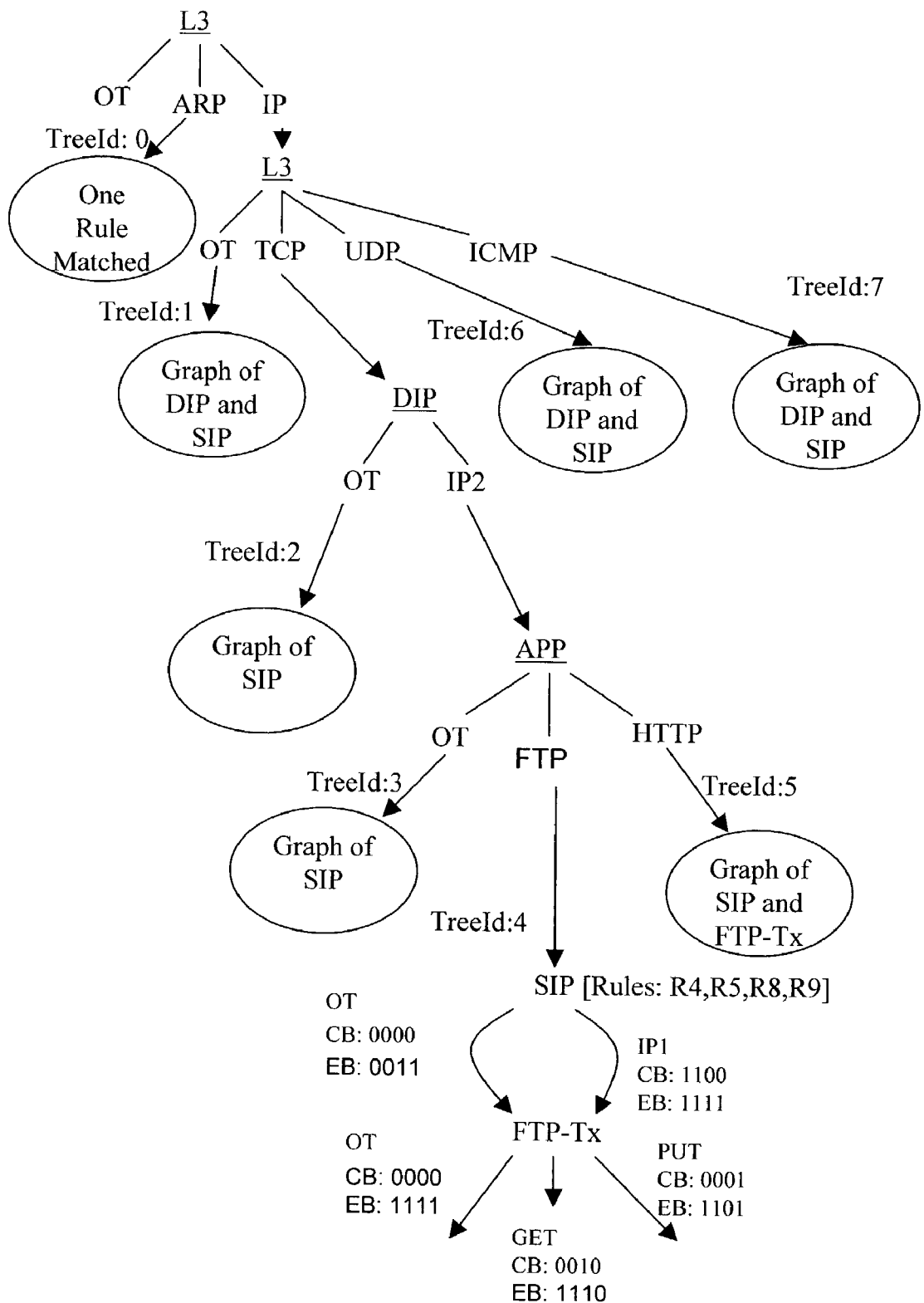
FIG. 17 illustrates a rule tree-graph with an exploded view of graph portion in accordance with an embodiment of the present invention.

FIG. 16 and FIG. 17 represent a rule tree-graph data structure constructed from the sample rule set.

FIG. 16 represents a rule tree-graph constructed for the given rule set. EV matrix represented in FIG. 12 is converted to this rule tree-graph by applying the steps represented in FIG. 13*a* and FIG. 13*b*.

The steps of tree generation were applied to reduced EV matrix 1402 in FIG. 14. FIG. 16 contains the expression APP and the values FTP, HTTP and OT as part of the tree portion of the rule tree-graph. The graph generation algorithm was applied to reduced EV matrices 1404, 1406 and 1408 as their size was below the cut off value. The graphs generated from the reduced EV matrices 1404, 1406 and 1408 form part of the graph portion of the rule tree-graph.

In this rule tree-graph the graph portions of the rule tree-graph is represented as oval boxes. The edges leading to these oval boxes represent the leaf edges of the tree portion of the rule tree graph. The leaf edge APP_FTP leads to oval box representing graph of SIP and FTP-TX. This graph has been exploded in FIG. 17.

FIG. 17 represents a tree-graph where one of the graph portions has been exploded. This figure is a more detailed representation of FIG. 16. TreeId: 0, TreeId: 1, TreeId: 2, TreeId: 3 TreeId: 4 TreeId: 5, TreeId: 6 and TreeId: 7 mentioned in the figure represent the unique tree IDs associated with each leaf edge of the tree.

The lead edge APP_FTP had tree ID 4; this leaf edge leads to the start of graph 'SIP' of the graph of SIP and FTP-TX. The exploded graph portion is shown, this graph is same as the graph generated in FIG. 15 from the reduced EV matrix 1406.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for compiling rules for an integrated policy enforcement system for a computer network, the integrated policy enforcement system comprising modules for implementing policies on network traffic, the method comprising the steps of:
   a. receiving an input, the input comprising description of expressions and values of the expressions;
   b. processing the input, wherein the step of processing the input comprises:
      i. creating an expression value tree for the expressions used in the rules;
      ii. creating an mutually exclusive set of values for an expression based on the expression value tree, wherein the mutually exclusive set of values for the expression is used for creating a modified set of rules; and
      iii. assigning expression weights to the expressions in the modified set of rules, wherein the expression weights are used for defining a tree generation process;
   c. generating a rule tree-graph data structure using the tree generation process, the rule tree-graph data structure comprising a tree data structure and a graph data structure, wherein the step of generating the rule tree-graph data structure comprises the steps of:
      i. creating an expression value matrix based on relations between the expressions and the values of the expressions;
      ii. receiving a cutoff value;
      iii. defining the tree generation process based on the cutoff value and the expression weights of the expressions in the modified set of rules; and
      iv. applying the tree generation process upon the expression value matrix; and
   d. outputting policy files from the rule tree-graph data structure, the policy files being used by the modules for implementing policies on the network traffic.

2. The method as recited in claim 1, wherein the step of receiving the input comprises the step of receiving an expression resource file, wherein the expression resource file describes relations between the expressions and the values of the expressions.

3. The method as recited in claim 1, wherein the step of receiving the input comprises the step of receiving multiple catalogues wherein the multiple catalogues contain data to which the rules point.

4. The method as recited in claim 3, wherein the multiple catalogues are time catalog object models containing data, the data comprising information regarding time related expressions used in the rules.

5. The method as recited in claim 1, wherein the step of processing the input further comprises the steps of:
   a. creating an expression value tree based on the input;
   b. adding adjacencies to the expression value tree, wherein the adjacencies are relations between an expression and a value of another expression;
   c. splitting OR'ed conditions in the rules to create a modified set of rules;
   d. adding implicit conditions to the modified set of rules based on the expression value tree;
   e. adding implicit rules to the modified set of rules;
   f. extracting Internet Protocol (IP) based expressions from the modified set of rules;
   g. extracting IP values of the IP based expressions from the modified set of rules;
   h. creating mutually exclusive sets of IP buckets from the IP values;
   i. creating an IP bucket lookup object model from the values of the IP based expressions; and
   j. assigning expression weights to the expressions in the modified set of rules.

6. The method as recited in claim 1, wherein the step of creating the expression value matrix comprises the steps of:
   a. creating cells in the expression value matrix, wherein the step of creating the cells comprises the steps of:
      i. creating rows in the expression value matrix, wherein the rows represent the rules;

ii. creating columns in the expression value matrix, wherein the columns represent the expressions; and
iii. arranging the expressions in the columns based on expression weights assigned to the expressions; and
b. assigning values to the cells, wherein the step of assigning the values comprises the steps of:
i. assigning values of the expressions to the cells if the values of the expressions are required for satisfying the rules in corresponding rows;
ii. assigning 'Do Not Care (*)' values to the cells if the values of the expressions are not predefined by the rules in the corresponding rows; and
iii. assigning 'Not Applicable (NA)' values to the cells when the values of the expressions are not required for satisfying the rules in the corresponding rows.

7. The method as recited in claim 1, wherein the step of defining the tree generation process comprises the steps of:
if the number of rules in the expression value matrix is greater than the cutoff value, then
a. defining a tree algorithm, wherein the defining the tree algorithm comprises the steps of:
i. picking the expression corresponding to a first column of the expression value matrix as a node of the tree data structure;
ii. picking various values of the picked expression as path edges of the node;
iii removing the first column of the expression value matrix for each path edge;
iv. removing the rows from the expression value matrix based on the value that the path edges represent; and
v. removing the columns from the expression value matrix based on the values of cells of the expression value matrix; and
if the number of the rules in the expression value matrix is less than or equal to the cutoff value, then:
b. defining a graph algorithm, wherein the defining the graph algorithm comprises the steps of:
i. picking the expression corresponding to the first column of the expression value matrix as a node of the graph data structure;
ii. picking distinct values of the picked expression as different path edges of the node;
iii. initializing a confirmation bitmap and an elimination bitmap for path edges;
iv. removing the columns in the expression value matrix based on the confirmation bitmap and the elimination bitmap;
v. removing the first column from the expression value matrix to create a reduced expression value matrix; and
vi. recursively using the graph algorithm on the reduced expression value matrix when the number of rules in the reduced expression value matrix is less than or equal to the cutoff value.

8. A method for compiling rules for an integrated policy enforcement system for a computer network, the integrated policy enforcement system comprising modules for implementing policies on network traffic, the method comprising the steps of:
a. receiving an input, the input comprising rules and related information;
b. processing the input to generate an output, wherein the step of processing the input comprises the steps of:
i. creating an expression relationship structure from the input, wherein the input is obtained from an expression resource file;
ii. adding adjacencies to the expression relationship structure;
iii. splitting OR'ed conditions in the rules to generate a first set of modified set of rules;
iv. adding implicit expressions to the first set of modified rules to generate a second set of modified rules;
v. adding implicit rules to the second set of modified rules to generate a third set of modified rules;
vi. extracting IP based expressions and their values from the third set of modified rules;
vii. creating mutually exclusive sets of IP buckets from the values of the IP based expressions in the third set of modified rules;
viii. modifying the third set of modified rules according to the mutually exclusive sets of IP buckets to create a final set of rules; and
ix. assigning expression weights to different expressions by using the final set of rules and a weight criteria;
c. generating a data structure using the output of the processing step; and
d. outputting policy files from the data structure.

9. A method for compiling rules for an integrated policy enforcement system for a computer network, the integrated policy enforcement system comprising modules for implementing policies on network traffic, the method comprising the steps of:
a. receiving an input, the input comprising the rules and related information;
b. processing the input to generate an output;
c. generating a data structure using the output of the processing step, wherein the step of generating the data structure further comprises the steps of:
i. creating an expression value matrix, wherein the step of creating the expression value matrix further comprises creating the expression value matrix by processing expression weights, an expression relationship structure with added adjacencies and a final set of rules, the expression value matrix consisting of cells, the rows of the expression value matrix corresponding to the final set of rules, the columns of the expression value matrix denoting the expressions in decreasing order of the expression weights, the cell being assigned a specific value if an expression corresponding to the column must possess that value for the corresponding rule represented by the row, the cell being assigned "Do Not Care (*)" if the value of the expression does not make a difference to the satisfaction of the corresponding rule, the cell being assigned "Not Applicable (NA)" if the value of an expression does not have significance for evaluation of the corresponding rule;
ii. defining a tree graph procedure; and
iii. applying the tree graph procedure upon the first column of the expression value matrix; and
d. outputting policy files from the data structure.

10. A system for compiling rules for an integrated policy enforcement system for computer networks, the integrated policy enforcement system comprising modules for implementing policies on network traffic, the system for compiling the rules receives a cutoff value, expression data, rules and a weight criteria, the expression data comprising definitions of a plurality of expressions, an expression denoting a property of the network traffic, the rule comprising an action associated with conditions, a condition comprising the plurality of expressions and their corresponding values, the system for compiling rules comprising:

a. a rule input module for processing an input and generating an output, wherein the rule input module further comprises:
   i. means for creating an expression relationship structure from the expression data;
   ii. means for adding adjacencies to the expression relationship structure;
   iii. means for splitting OR'ed conditions in the rules to generate a first set of modified rules;
   iv. means for adding implicit expressions to the first set of modified rules to generate a second set modified rules;
   v. means for adding implicit rules to the second set of modified rules to generate a third set of modified rules;
   vi. means for extracting IP based expressions and their values from the third set of modified rules;
   vii. means for creating mutually exclusive sets of IP buckets and an IP lookup object model from the values of the IP based expressions in the third set of modified rules;
   viii. means for modifying the third set of modified rules according to the mutually exclusive sets of IP buckets to create a final set of rules; and
   ix. means for assigning expression weights to different expressions by using the final set of rules and the weight criteria;
b. a rule tree generator module that generates a rule tree-graph structure from the output generated by the rule input module; and
c. an output module for outputting policy files from the rule tree-graph structure and object models.

11. The system as recited in claim 10, wherein the rule tree generator module comprises:
   a. means for creating an expression value matrix based on relations between the expressions and the values of the expressions, wherein the means for creating an expression value matrix comprises:
      i. means for processing expression weights;
      ii. means for identifying adjacencies between the expressions and the values of the expressions, wherein the adjacencies are relations between an expression and a value of another expression; and
      iii. means for identifying non-adjacencies between the expressions and the values of the expressions;
   b. means for receiving a cutoff value;
   c. means for defining a tree generation process based on the cutoff value and the expression weights of the expressions in the modified set of rules; and
   d. means for generating the rule tree-graph data structure by applying the tree generation process on the expression value matrix.

* * * * *